(12) United States Patent  (10) Patent No.: US 8,111,038 B2
Wang et al.  (45) Date of Patent: Feb. 7, 2012

(54) VEHICLE ELECTRONIC SYSTEMS WITH BATTERY MANAGEMENT FUNCTIONS

(75) Inventors: Shaolan Wang, Beijing (CN); Wei Zhang, Shanghai (CN); Ruichao Tang, Shenzhen (CN)

(73) Assignee: O2 Micro, Inc, Santa Clara, CA (US)

( * ) Notice: Subject to any disclaimer, the term of this patent is extended or adjusted under 35 U.S.C. 154(b) by 0 days.

(21) Appl. No.: 12/886,426

(22) Filed: Sep. 20, 2010

(65) Prior Publication Data

US 2011/0006731 A1   Jan. 13, 2011

(30) Foreign Application Priority Data

Sep. 3, 2010   (CN) .......................... 2010 1 0273401

(51) Int. Cl.
*H02J 7/14* (2006.01)
*H02J 7/00* (2006.01)
*G01N 27/416* (2006.01)
*B60K 1/00* (2006.01)

(52) U.S. Cl. ........ 320/104; 320/132; 320/136; 324/430; 180/65.1; 180/65.21; 180/165

(58) Field of Classification Search .................... 320/104
See application file for complete search history.

(56) References Cited

U.S. PATENT DOCUMENTS

| 6,208,117 | B1 | 3/2001 | Hibi |
| 6,268,710 | B1 | 7/2001 | Koga |
| 6,329,796 | B1 | 12/2001 | Popescu |
| 6,617,826 | B2 * | 9/2003 | Liao et al. ..................... 320/118 |
| 6,653,817 | B2 * | 11/2003 | Tate et al. ..................... 320/132 |
| 6,741,066 | B1 | 5/2004 | Densham et al. |
| 6,853,165 | B2 | 2/2005 | Chen |
| 7,081,737 | B2 | 7/2006 | Liu |
| 7,088,076 | B2 | 8/2006 | Densham et al. |
| 7,176,654 | B2 | 2/2007 | Meyer et al. |
| 7,262,580 | B2 | 8/2007 | Meyer et al. |
| 7,285,936 | B2 | 10/2007 | Ohnuma et al. |
| 7,312,219 | B2 | 12/2007 | Dang et al. |
| 7,323,847 | B2 | 1/2008 | Meyer et al. |
| 7,345,451 | B2 | 3/2008 | Chen |
| 7,622,830 | B2 | 11/2009 | Cioaca et al. |

(Continued)

FOREIGN PATENT DOCUMENTS

CN   1395756 A   2/2003

(Continued)

OTHER PUBLICATIONS

English Translation of First Office Action for JP 2007-238300 dated Jan. 27, 2009.

(Continued)

*Primary Examiner* — Yalkew Fantu

(57) ABSTRACT

An electronic system in a vehicle includes a motor, a charger, a battery pack, and a bus. The motor drives wheels and propellers of the vehicle. The charger generates charging power according to a control signal. The battery pack coupled to the charger and the motor is operable for generating the control signal based upon a status of each cell of multiple cells in the battery pack, for receiving the charging power via a charging path when the vehicle is stalled, and for powering the motor via a discharging path when the vehicle is started. The bus coupled to the charger and the battery pack is operable for transmitting the control signal from the battery pack to the charger.

18 Claims, 15 Drawing Sheets

U.S. PATENT DOCUMENTS

| | | |
|---|---|---|
| 2002/0060554 A1 | 5/2002 | Odaohhara et al. |
| 2002/0069000 A1* | 6/2002 | Nakao .............................. 701/22 |
| 2006/0107763 A1* | 5/2006 | Paek ........................ 73/862.193 |
| 2006/0145658 A1 | 7/2006 | Wang |
| 2006/0164038 A1 | 7/2006 | Demers et al. |
| 2006/0291259 A1 | 12/2006 | Densham et al. |
| 2007/0273334 A1 | 11/2007 | Meyer |
| 2007/0284159 A1* | 12/2007 | Takami et al. ................ 180/65.1 |
| 2008/0030168 A1 | 2/2008 | Hsu et al. |
| 2008/0218130 A1* | 9/2008 | Guo et al. ..................... 320/162 |

FOREIGN PATENT DOCUMENTS

| | | |
|---|---|---|
| CN | 1471192 A | 1/2004 |
| CN | 2676428 Y | 2/2005 |
| EP | 1796243 A2 | 6/2007 |
| JP | 2000-197212 A | 7/2000 |
| JP | 2005151683 A | 6/2005 |
| JP | 2007-115472 A | 5/2007 |

OTHER PUBLICATIONS

OZ8770/1 Cool Charge Controller with Adapter Power Recognition Function (21 pages).

* cited by examiner

VEHICLE ELECTRONIC SYSTEMS WITH BATTERY MANAGEMENT FUNCTIONS

RELATED APPLICATION

This application is a continuation-in-part of the U.S. patent application Ser. No. 12/157,698, titled "Power Management Systems with Controllable Adapter Output," filed on Jun. 12, 2008, now U.S. Pat. No. 7,973,515, which is hereby incorporated by reference in its entirety, and which itself is a continuation-in-part of the co-pending U.S. patent application Ser. No. 11/821,042, titled "Battery Management Systems with Controllable Adapter Output," filed on Jun. 20, 2007, which itself claims priority to U.S. Provisional Patent Application Ser. No. 60/905,679, filed on Mar. 7, 2007. This application also claims priority to Chinese Patent Application No. 201010273401.6, titled "Battery Management Systems and Methods for Controlling a Vehicle," filed on Sep. 3, 2010, with the State Intellectual Property Office of the People's Republic of China.

BACKGROUND

FIG. 1 shows a block diagram of a conventional battery charging circuit 100. As shown in FIG. 1, the battery charging circuit 100 is implemented by an adapter 102, a pulse width modulation controller 108, a charger controller 110, and a battery protection circuit (not shown) in the battery pack 104. The adapter 102 outputs a fixed voltage, and a charger 106 (shown as the pulse width modulation controller 108 and the charger controller 110) steps down the output voltage of the adapter 102 by controlling power switches and a buck converter in block 112. Consequently, conventional battery charging circuits can be relatively large and costly.

FIG. 2 shows a block diagram of another conventional charging circuit 200. The charging circuit 200 includes a controllable adapter 202 and an external control chip shown as a charger controller 210. The external control chip (charger controller 210) controls an output power of the controllable adapter 202 according to a current/voltage of the battery pack 204. As shown in FIG. 2, the charging circuit 200 also needs an extra switch 212 to control a charging current of the battery pack 204. As a result, such battery charging circuits are also relatively large and costly.

In conventional charging circuits such as the charging circuit 100 and 200, due to unbalancing issues (e.g., cells in the battery pack may have different voltages/capacities), some cells may reach an over-voltage condition even though others have not yet been fully charged. Although a cell balancing circuit can be used to relieve cells from such unbalancing issues, cell balancing is typically enabled only when the battery is nearly fully charged, in order to avoid excessive heat generation. As a result of the limited balancing time, the cell balancing circuit may not be effective. In other words, the charging process is not accurate enough across all of the cells.

Battery packs are also used in electric vehicles. Electric vehicles use one or more electric motors for propulsion. The motors can draw the electric power from the battery pack to drive the wheels or propellers. The electric vehicle can be equipped with a battery charging circuit which transfers energy from a conventional power outlet or a dedicated charging station to charge the battery pack. The battery pack in an electric vehicle includes a relatively great number of battery cells coupled in series, e.g., more than 100 cells, which increases the complexity of the wire connections among different cells. In addition, the conventional charging circuit, e.g., the charging circuit 100 or 200, may not fully charge all of the cells during a charging process. Thus, the lifetime of the battery back in the electric vehicle may be shortened, thereby decreasing the power efficiency of the battery back.

SUMMARY

In one embodiment, an electronic system in a vehicle includes a motor, a charger, a battery pack, and a bus. The motor drives wheels and propellers of the vehicle. The charger generates charging power according to a control signal. The battery pack coupled to the charger and the motor is operable for generating the control signal based upon a status of each cell of multiple cells in the battery pack, for receiving the charging power via a charging path when the vehicle is stalled, and for powering the motor via a discharging path when the vehicle is started. The bus coupled to the charger and the battery pack is operable for transmitting the control signal from the battery pack to the charger.

BRIEF DESCRIPTION OF THE DRAWINGS

Features and advantages of embodiments of the subject matter will become apparent as the following detailed description proceeds, and upon reference to the drawings, wherein like numerals depict like parts, and in which.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provides a vehicle electronic system in a vehicle. The vehicle electronic system includes a motor, a charger, a battery pack, and a bus. The charger generates a charging power in response to a control signal. The battery pack coupled to the charger and the motor generates the control signal based upon a status of each cell of a plurality of cells in the battery pack, receives the charging power via a charging path when the vehicle is stalled, and powers the motor via a discharging path when the vehicle is started. The bus transmits the control signal from the battery pack to the charger. Advantageously, the charging mode for charging the battery pack is determined by the battery pack rather than the charger. Thus, the charger is adaptable for charging different types of battery cells. Moreover, different charging modes can be enabled according to an individual cell status. Thus, all the cells can be fully charged and any undesirable condition can be avoided. Therefore, the battery life is extended, which further improves the power efficiency of the vehicle electronic system and thus reduces the reliance on fossil fuels, pollutants and greenhouse gas emissions.

Figure 3:
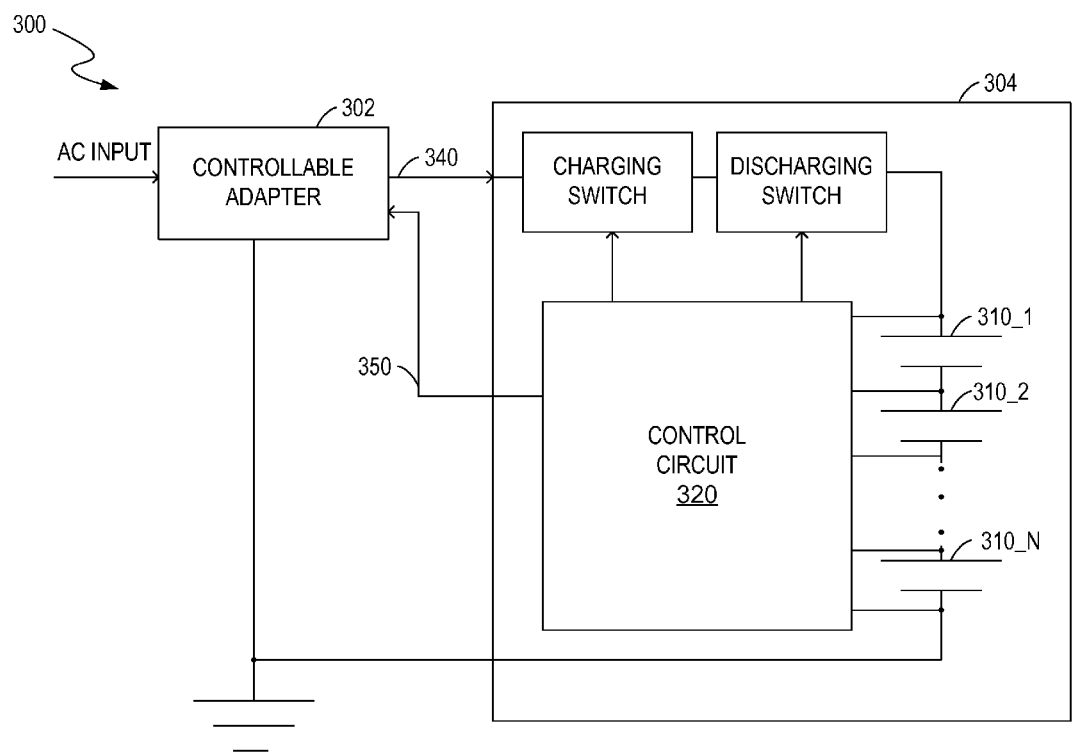
FIG. 3 shows a block diagram of a battery management system, in accordance with one embodiment of the present invention.

FIG. 3 shows a block diagram of a battery management system 300, in accordance with one embodiment of the present invention. The battery management system 300 includes an adapter 302 (e.g., a controllable adapter) for charging a battery pack 304 which has a plurality of cells 310_1, 310_2, . . . , and 310_n.

A control circuit 320 can be used to monitor the battery pack 304 and generate a control signal 350 for controlling an output power of the adapter 302 in order to enable multiple charging modes, in one embodiment. More specifically, the control circuit 320 can be used to generate a control signal 350 according to a status (e.g., cell voltage, cell current, cell temperature, and cell capacity) of each cell of the plurality of cells 310_1-310_n in the battery pack 304. In one embodiment, the adapter 302 coupled to the control circuit 320 charges the battery pack 304. Advantageously, an output power at an output 340 of the adapter 302 is adjusted according to the control signal 350.

In one embodiment, the control circuit 320 is integrated in the battery pack 304. As such, the battery pack 304 is able to control the output 340 of the controllable adapter 302 directly according to individual cell status. Therefore, external control chips (e.g., charger controllers) and external power switches can be removed.

In one embodiment, the control circuit 320 enables, but is not limited to, standard constant current charging mode CCn (n=0), light constant current charging mode CCn (n=1, 2, . . . , max, where max is a predetermined maximum number of n, which indicates the number of different light constant current charging modes), standard constant voltage charging mode CVm (m=0), light constant voltage charging mode CVm (m=1, 2, . . . , max', where max' is a predetermined maximum number of m, which indicates the number of different light constant voltage modes), and charging termination mode. In one embodiment, a light constant current charging mode or a light constant voltage charging mode can be enabled when an unbalanced condition occurs. In one embodiment, the charging termination mode can be enabled when any undesirable/error condition occurs or when all the cells are fully charged.

Advantageously, a standard constant current charging mode CC0 is enabled when the control signal 350 controls the adapter 302 to provide a constant charging current I0 at output 340, in one embodiment. As such, the battery pack 304 is charged by a constant charging current I0. A light constant current charging mode CCn (n=1, 2, . . . , max) is enabled when the control signal 350 controls the adapter 302 to provide a constant light charging current In (n=1, 2, . . . , max) at output 340, in one embodiment. As such, the battery pack 304 is charged by a constant light charging current In (n=1, 2, . . . , max). In one embodiment, I0>I1>I2> . . . >Imax.

Similarly, a standard constant voltage charging mode CV0 is enabled when the control signal 350 controls the adapter 302 to provide a constant charging voltage V0 at output 340, in one embodiment. As such, the battery pack 304 is charged by a constant charging voltage V0. A light constant voltage charging mode CVm (m=1, 2, . . . , max') is enabled when the control signal 350 controls the adapter 302 to provide a constant light charging voltage Vm(m=1, 2, . . . , max') at output 340, in one embodiment. As such, the battery pack 304 is charged by a constant light charging voltage Vm(m=1, 2, . . . , max'). In one embodiment, V0>V1>V2> . . . >Vmax'.

Advantageously, by enabling different charging modes (CC0,CC1, . . . , CCmax and CV0, CV1, . . . , CVmax') according to individual cell status, all the cells can be fully charged and any undesirable condition can be avoided, thereby extending the battery life.

As described above, in one embodiment, the control circuit 320 monitors individual cell status and controls an output power of the adapter 302 in order to enable multiple charging modes (CC0, CC1, . . . , CCmax and CV0, CV1, . . . , CVmax'). In another embodiment, a control circuit can also be implemented outside the battery pack 304, which monitors battery pack 304 (e.g., battery pack voltage and battery pack current) and generates a control signal to enable multiple charging modes (CC0, CC1, . . . , CCmax and CV0, CV1, . . . , CVmax').

Figure 4:
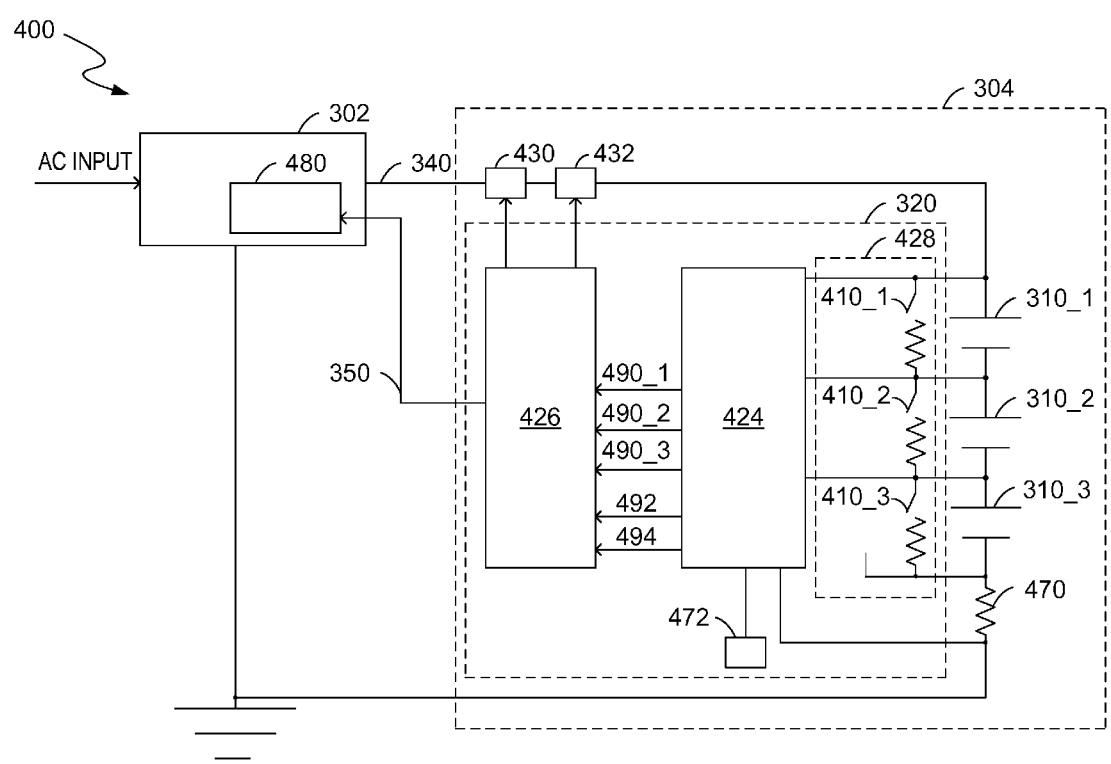
FIG. 4 shows another block diagram of a battery management system, in accordance with one embodiment of the present invention.

FIG. 4 shows another block diagram of a battery management system 400, in accordance with one embodiment of the present invention. Elements that are labeled the same as in FIG. 3 have similar functions and will not be repetitively described herein for purposes of brevity and clarity. In the example of FIG. 4, the battery pack 304 includes three cells 310_1, 310_2, and 310_3.

In FIG. 4, a monitoring circuit 424 (e.g., a gas gauge circuit) is configured to monitor a cell status (e.g., cell voltage, cell current, cell temperature, and cell capacity) for each individual cell 310_1-310_3, and protect each cell 310_1-310_3 from any undesirable conditions (e.g., over-voltage, over-current, over-temperature, and over-charge). In one embodiment, the monitoring circuit 424 monitors each cell 310_1-310_3 and generates a monitoring signal for each cell 310_1-310_3 indicative of the cell status.

For example, the monitoring circuit 424 monitors voltages of cells 310_1-310_3 and generates monitoring signals 490_1-490_3 indicating voltages of cells 310_1-310_3, respectively. In one embodiment, since all the cells 310_1-310_3 have the same current, the monitoring circuit 424 monitors a battery current via a sensing resistor 470 and generates a monitoring signal 492 indicating the battery current. In one embodiment, the monitoring circuit 424 also monitors a battery temperature via a temperature sensor 472, and generates a monitoring signal 494 indicating the battery temperature. In one embodiment, the monitoring circuit 424 can also monitor capacities of cells 310_1-310_3 and generates monitoring signals (not shown) indicating capacities of cells 310_1-310_3, respectively.

Advantageously, in one embodiment, a command converter 426 coupled to the monitoring circuit 424 generates a control signal 350 according to monitoring signals 490_1-490_3, 492 and 494. More specifically, the command converter 426 integrated in the battery pack 304 can be used to generate the control signal 350 for controlling an output power of the adapter 302 based on individual cell status. Accordingly, different charging modes can be enabled according to individual cell status, in one embodiment. In one embodiment, the command converter 426 is implemented outside the battery pack 304. In one such embodiment, the command converter 426 can receive monitoring signals 490_1-490_3, 492 and 494 via a serial bus coupled between the command converter 426 and the battery pack 304, for example, a 1-wire bus or a 2-wire bus (e.g., SMBus bus and I2C bus, etc.).

In one embodiment, the command converter 426 can be implemented by a processor (e.g., a microprocessor) or a state machine. In one embodiment, the command converter 426 enables, but is not limited to, standard constant current charging mode CCn (n=0), light constant current charging mode CCn (n=1, 2, ..., max), standard constant voltage charging mode CVm (m=0), light constant voltage charging mode CVm (m=1, 2, ..., max'), and charging termination mode.

In one embodiment, the control signal 350 is analog control signal. The analog control signal can be used to control a duty cycle of a pulse width modulation signal generated by a pulse width modulation signal generator 480. In one embodiment, the pulse width modulation signal generator 480 is in the adapter 302. By adjusting the duty cycle of the pulse width modulation signal, the output power of the adapter 302 at output 340 can be adjusted accordingly. In other words, different charging modes can be enabled by controlling the duty cycle of the pulse width modulation signal in the adapter 302, in one embodiment. For example, if a standard constant current charging mode (CC0) needs to be enabled according to individual cell status, the analog control signal will adjust the duty cycle of the pulse width modulation signal, such that the adapter 302 outputs a constant current I0.

In one embodiment, the control signal 350 is a digital control signal. A decoder can be implemented in the adapter 302 to convert the digital control signal to an analog control signal in order to control the duty cycle of the pulse width modulation signal in the adapter 302, in one embodiment.

Furthermore, the command converter 426 also controls a charging switch 430 and a discharging switch 432 in the battery pack 304, in one embodiment. In one embodiment, battery charging will be terminated when the charging switch 430 is switched off. The discharging switch 432 will be switched on when the battery pack 304 provides power to a system load (not shown), in one embodiment.

In one embodiment, a cell balancing circuit 428 for balancing cells 310_1-310_3 is included in the battery pack 304 in order to improve performance of cells 310_1-310_3. The cell balancing circuit 428 can be implemented outside the monitoring circuit 424 or inside the monitoring circuit 424. In one embodiment, a bleeding current (bypass current) can be enabled by the cell balancing circuit 428 for an unbalanced cell in order to reduce a current flowing through the unbalanced cell. As shown in the cell balancing circuit 428, a bleeding current of cell 310_1 is enabled when a switch 410_1 is switched on. A bleeding current of cell 310_2 is enabled when a switch 410_2 is switched on. A bleeding current of cell 310_3 is enabled when a switch 410_3 is switched on. Switches 410_1-410_3 can be controlled by the monitoring circuit 424 or the command converter 426. As such, the cell balancing circuit 428 can be controlled by the monitoring circuit 424 or the command converter 426.

Cell unbalanced conditions may include, but are not limited to, the following conditions. In one embodiment, a cell is unbalanced when the cell has a voltage difference relative to any other cell, where that voltage difference exceeds a predetermined voltage difference $\Delta V$. In another embodiment, a cell is unbalanced when the cell has a voltage which exceeds a predetermined threshold voltage Vbalance. In yet another embodiment, a cell is unbalanced when the cell has a dV/dt (a differential in cell voltage with respect to a differential in charging time) that exceeds a predetermined threshold $$\left(\frac{dV}{dt}\right)_{th}.$$

In yet another embodiment, a cell is unbalanced when the cell has a capacity difference relative to any other cell, where that capacity difference exceeds a predetermined capacity difference $\Delta C$.

Advantagesously, as described above, the adapter 302 will charge the battery pack 304 with a smaller charging current (light constant current charging mode) when an unbalanced condition occurs. Therefore, the cell balancing circuit 428 will have a longer time to perform cell balancing (by enabling bleeding current) in order to fully charge all the cells.

Figure 5:
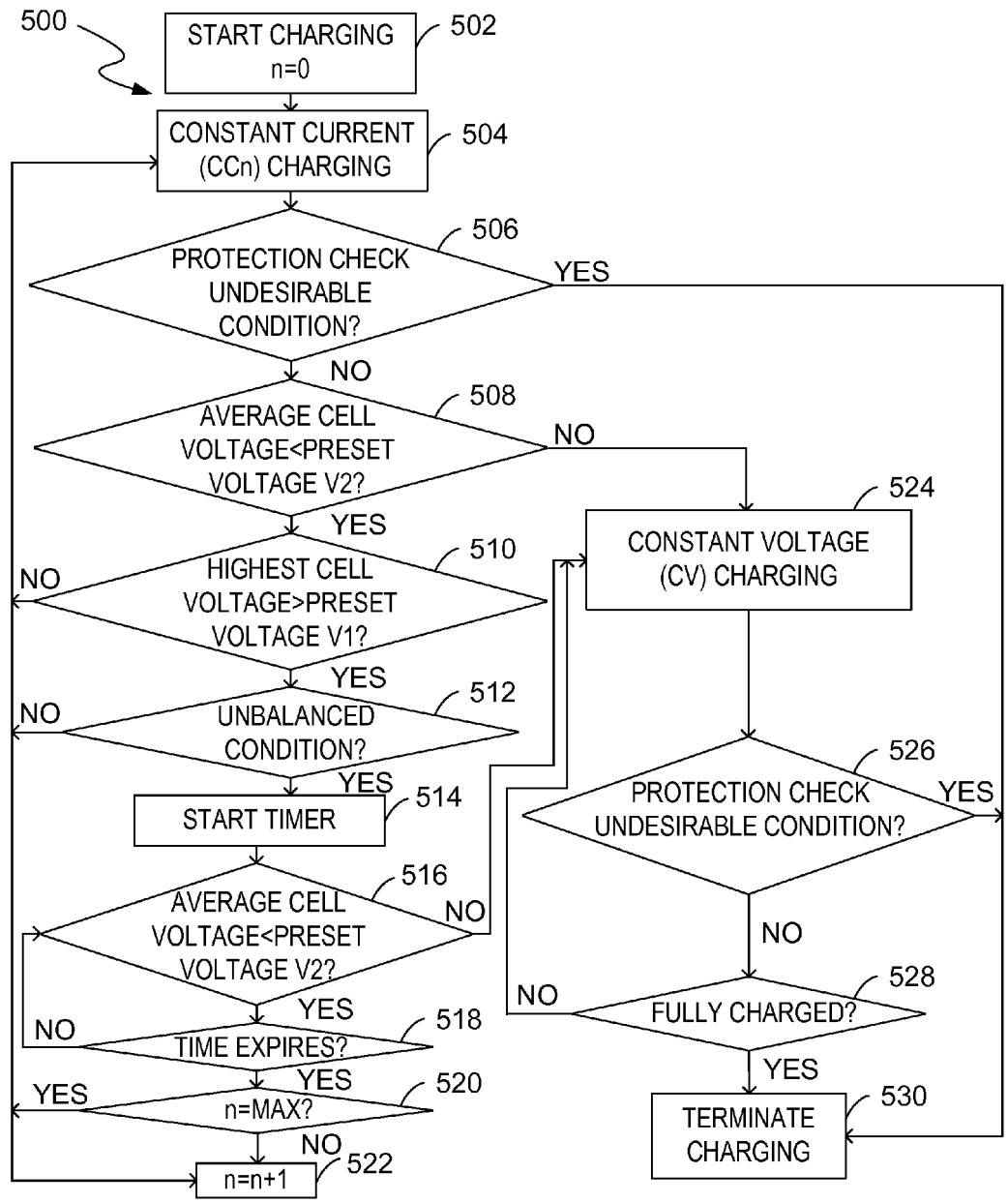
FIG. 5 shows a flowchart of operations performed by a battery management system, in accordance with one embodiment of the present invention.

FIG. 5 shows a flowchart 500 of operations performed by a battery management system, in accordance with one embodiment of the present invention. In one embodiment, the command converter 426 can be configured, such that the battery management system in FIG. 4 operates in a way shown in flowchart 500. More specifically, flowchart 500 illustrates which charging mode will be enabled by the command converter 426 according to different cell status, in one embodiment. FIG. 5 is described in combination with FIG. 3 and FIG. 4.

In the example of FIG. 5, the battery management system first charges the battery pack 304 in a standard constant current charging mode CC0, in one embodiment. The battery management system charges the battery pack 304 in light constant current charging modes CCn(n=1, 2, ..., max) if any unbalanced condition occurs, in one embodiment. If a highest cell voltage (e.g., if cell 310_1 has a voltage of 3.80V, cell 310_2 has a voltage of 3.90V, and cell 310_3 has a voltage of 4.05V, then the highest cell voltage is equal to 4.05V) of the battery pack 304 is greater than a preset voltage V1 (e.g., 3.9V for Lithium Ion cells), the battery management system will perform an unbalance check to see if there is any unbalanced condition, in one embodiment. In one embodiment, when there is an unbalanced condition, the battery management system not only enables a bleeding current for any unbalanced cell by the cell balancing circuit 428, but also adjusts (e.g., reduces) a charging current of the battery pack 304. If an average cell voltage of the battery pack 304 is greater than a preset voltage level V2 (e.g., 4.2V for Lithium Ion cells), the battery management system charges the battery pack 304 in a constant voltage charging mode (e.g., a standard constant voltage charging mode CV0), in one embodiment. The battery management system also performs a protection check, in one embodiment.

The battery management system starts charging the battery pack 304 and n (which represents different constant current charging modes) is initialized to 0 in block 502. A constant current charging mode CCn is enabled by the control signal 350 in block 504. For example, when n is set to 0, a standard constant current charging mode CC0 will be enabled. When n is between 1 and max, a light constant current charging mode CCn (n=1, 2, . . . , max) will be enabled. A protection check is performed in block 506. For example, the command converter 426 receives monitoring signals from the monitoring circuit 424 and determines whether any undesirable condition (e.g., over-voltage, over-current, and over-temperature) has occurred, in one embodiment. If there is any undesirable condition, the flowchart goes to block 530 to terminate battery charging (charging termination mode). As such, the command converter 426 will switch off the charging switch 430 to terminate battery charging. If there is no undesirable condition, the flowchart goes to block 508.

In block 508, an average cell voltage of the battery pack 304 is compared with a preset voltage level V2 (e.g., 4.2V for Lithium Ion cells), for example, by the command converter 426, to determine whether a constant voltage charging mode (e.g., a standard constant voltage charging mode CV0) can be enabled or not. In one embodiment, if the average cell voltage of the battery pack 304 is greater than the preset voltage level V2, which indicates that the battery pack 304 can be charged in a constant voltage charging mode (e.g., a standard constant voltage charging mode CV0), the flowchart goes to block 524.

In block 524, the constant voltage charging mode (e.g., a standard constant voltage charging mode CV0) is enabled by the control signal 350. In block 526, a protection check (similar to block 506) is performed. If there is any undesirable condition, the flowchart goes to block 530 to terminate battery charging (charging termination mode). Otherwise, the flowchart goes to block 528.

In block 528, if all the cells in the battery pack 304 are fully charged, the flowchart goes to block 530 to terminate charging (charging termination mode). Otherwise, the flowchart returns to block 524 and the battery pack 304 continues to be charged under a constant voltage charging mode (e.g., a standard constant voltage charging mode CV0) as shown in block 524. In one embodiment, the command converter 426 receives voltage monitoring signals from the monitoring circuit 424 and determines whether all the cells are fully charged.

Returning to block 508, if the average cell voltage of the battery pack 304 is less than the predetermined voltage level V2, which indicates that the battery pack 304 can still be charged in a standard/light constant current charging mode, the flowchart goes to block 510.

In block 510, the highest cell voltage is compared with a preset voltage V1 (e.g., 3.9V for Lithium Ion cells), for example, by the command converter 426. The preset voltage V1 is used to determine whether to perform an unbalance check. In one embodiment, if the highest cell voltage is greater than the preset voltage V1, the unbalance check will be performed and the flowchart goes to block 512. If the highest cell voltage is less than the preset voltage V1, the flowchart returns to block 504. Any repetitive description following block 504 that has been described above will be omitted herein for purposes of clarity and brevity.

In block 512, an unbalance check is performed. If there is no unbalanced condition, the flowchart returns to block 504. If there is any unbalanced condition, a bleeding current is enabled for any unbalanced cell (step not shown in flowchart 500), and the flowchart goes to block 514.

In block 514, a timer is started. In block 516, an average cell voltage of the battery pack 304 is compared with a preset voltage level V2 (similar to block 508), for example, by the command converter 426, to determine whether a constant voltage charging mode (e.g., a standard constant voltage charging mode CV0) can be enabled or not. In one embodiment, if the average cell voltage of the battery pack 304 is greater than the preset voltage level V2, which indicates that the battery pack 304 can be charged in a constant voltage charging mode (e.g., a standard constant voltage mode CV0), the flowchart goes to block 524. Any repetitive description following block 524 that has been described above will be omitted herein for purposes of clarity and brevity.

Returning to block 516, if the average cell voltage of the battery pack 304 is less than the preset voltage level V2, which indicates that the battery pack 304 can still be charged in a standard/light constant current charging mode, the flowchart goes to block 518. In block 518, if the timer expires (e.g., the timer runs up to a predetermined time), the flowchart goes to block 520. If the timer does not expire, the flowchart returns to block 516.

In block 520, n is compared with a predetermined maximum number max, for example, by the command converter 426. If n is equal to the predetermined maximum number max, the flowchart returns to block 504 to continue the light constant current mode CCmax. Otherwise, the flowchart goes to block 522. In block 522, n is increased by 1 and the flowchart returns to block 504. Any repetitive description following block 504 that has been described above will be omitted herein for purposes of clarity and brevity.

Figure 6:
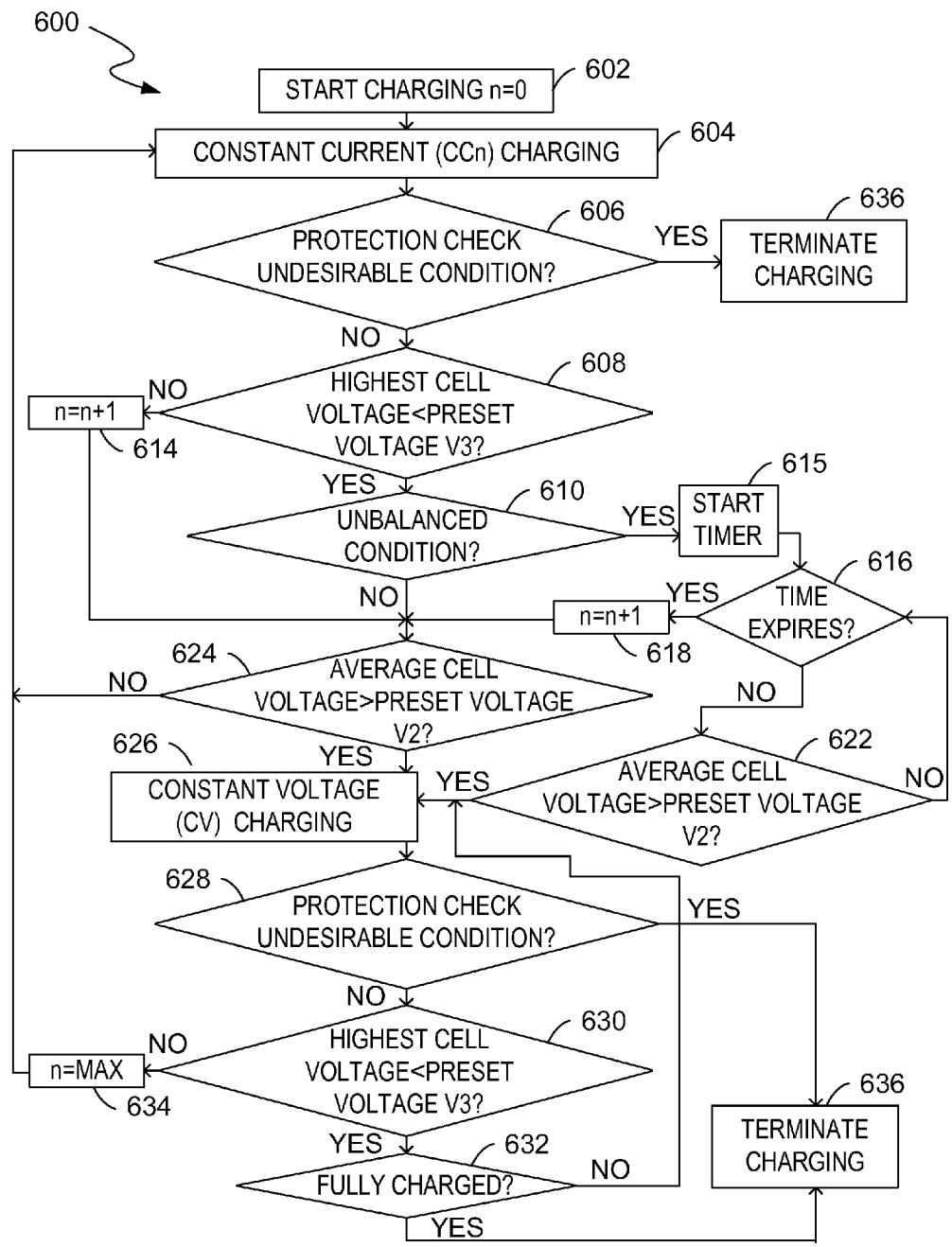
FIG. 6 shows another flowchart of operations performed by a battery management system, in accordance with one embodiment of the present invention.

FIG. 6 shows another flowchart 600 of operations performed by a battery management system, in accordance with one embodiment of the present invention. In one embodiment, the command converter 426 can be configured, such that the battery management system in FIG. 4 operates in a way shown in flowchart 600. FIG. 6 is described in combination with FIG. 3 and FIG. 4.

In the example of FIG. 6, the battery management system first charges the battery pack 304 in a standard constant current charging mode CC0, in one embodiment. The battery management system charges the battery pack 304 in light constant current charging modes CCn(n=1, 2, . . . , max) if any unbalanced condition occurs, in one embodiment. If an average cell voltage of the battery pack 304 is greater than a preset voltage level V2 (e.g., 4.2V for Lithium Ion cells), the battery management system charges the battery pack 304 in a constant voltage charging mode (e.g., a standard constant voltage charging mode CV0), in one embodiment. If a highest cell voltage of the battery pack 304 is greater than a preset voltage V3 (e.g., 4.3V for Lithium Ion cells) and the average cell voltage is less than the preset voltage V2, the battery management system changes a constant current charging mode from CCn to CCn+1, thereby reducing the charging current to enable over-voltage protection, in one embodiment. The battery management system also performs protection check, in one embodiment.

The battery management system starts charging the battery pack 304 and n (which represents different constant current charging modes) is initialized to 0 in block 602. Constant current charging mode CCn is enabled by the control signal 350 in block 604. For example, when n is set to 0, a standard current charging mode CC0 will be enabled. When n is between 1 and max, a light current charging mode CCn (n=1, 2, ..., max) will be enabled. A protection check is performed in block 606. For example, the command converter 426 receives monitoring signals from the monitoring circuit 424 and determines whether any undesirable condition (e.g., over-voltage, over-current, and over-temperature) has occurred, in one embodiment. If there is any undesirable condition, the flowchart goes to block 636 to terminate battery charging (charging termination mode). As such, the command converter 426 will switch off the charging switch 430 to terminate battery charging. If there is no undesirable condition, the flowchart goes to block 608.

In block 608, a highest cell voltage is compared with a preset voltage V3, for example, by the command converter 426, in order to check if there is any over-voltage condition. If the highest cell voltage is greater than the preset voltage V3 (which indicates there is an over-voltage condition), the flowchart goes to block 614. In block 614, n is increased by 1. The flowchart goes to block 624 to check if a constant voltage charging mode (e.g., a standard constant voltage charging mode CV0) can be enabled or not. If the highest cell voltage is less than the preset voltage V3 (which indicates there is no over-voltage condition), the flowchart goes to block 610.

In block 610, an unbalance check is performed. If there is no unbalanced condition, the flowchart goes to block 624 to check if a constant voltage charging mode (e.g., a standard constant voltage charging mode CV0) can be enabled or not. If there is any unbalanced condition, a bleeding current is enabled for any unbalanced cell (step not shown in flowchart 600), and the flowchart goes to block 615.

In block 615, a timer is started. In block 616, if the timer expires, the flowchart goes to block 618 and n is increased by 1. The flowchart goes to block 624 to check if a constant voltage charging mode (e.g., a standard constant voltage charging mode CV0) can be enabled or not.

In block 624, an average cell voltage is compared with a preset voltage V2, for example, by the command converter 426, in order to determine whether a constant voltage charging mode can be enabled or not. If the average cell voltage is less than the preset voltage V2, the flowchart returns to block 604. Any repetitive description following block 604 that has been described above will be omitted herein for purposes of clarity and brevity.

If the average voltage is greater than the preset voltage V2, the flowchart goes to block 626 to enable a constant voltage charging mode (e.g., a standard constant voltage mode CV0).

Returning to block 616, if the timer does not expire, the flowchart goes to block 622 (similar to block 624) to check if a constant voltage charging mode (e.g., a standard constant voltage charging mode CV0) can be enabled or not. In block 622, an average cell voltage is compared with the preset voltage V2, for example, by the command converter 426. If the average cell voltage is less than the preset voltage V2, the flowchart returns to block 616. Any repetitive description following block 616 that has been described above will be omitted herein for purposes of clarity and brevity. If the average cell voltage is greater than the preset voltage V2, the flowchart goes to block 626 to enable a constant voltage charging mode (e.g., a standard constant voltage charging mode CV0).

In block 628, a protection check is performed (similar to block 606). If there is any undesirable condition, the flowchart goes to block 636 to terminate battery charging (charging termination mode). If there is no undesirable condition, the flowchart goes to block 630. In block 630, a highest cell voltage is compared with the preset voltage V3 (similar to block 608), for example, by the command converter 426, in order to check if there is any over-voltage condition. If the highest cell voltage is greater than the preset voltage V3 (which indicates that there is an over-voltage condition), the flowchart goes to block 634. In block 634, n is set to a predetermined maximum value max and the flowchart returns to block 604. As such, a minimum charging current Imax (I0>I1>I2> ... >Imax) is enabled. If the highest cell voltage is less than the preset voltage V3 (which indicates that there is no over-voltage condition), the flowchart goes to block 632. In block 632, if all the cells are fully charged, the flowchart goes to block 636 to terminate charging. Otherwise, the flowchart returns to block 626 to continue a constant voltage charging mode. Any repetitive description following block 626 that has been described above will be omitted herein for purposes of clarity and brevity.

Figure 7:
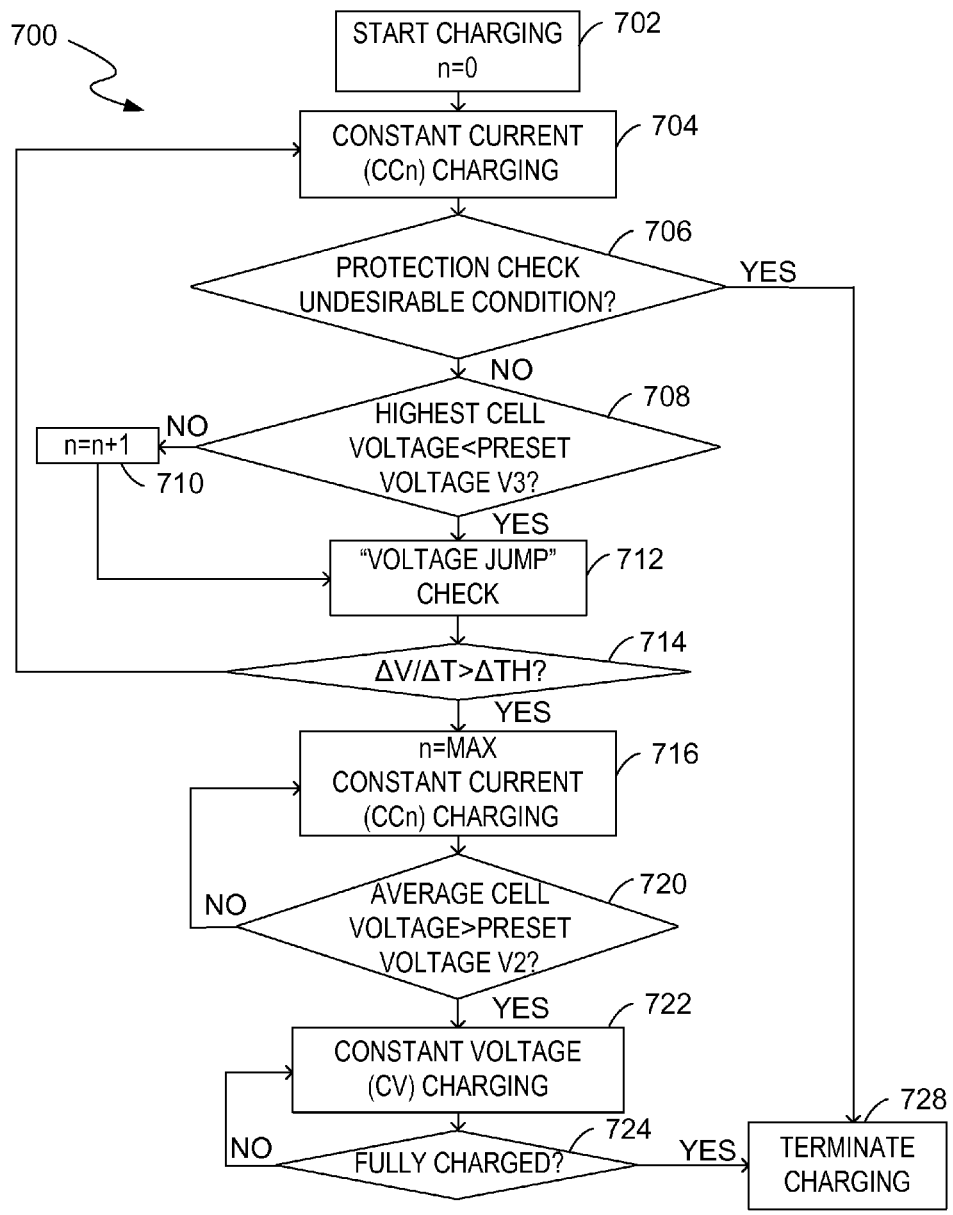
FIG. 7 shows another flowchart of operations performed by a battery management system, in accordance with one embodiment of the present invention.

FIG. 7 shows another flowchart 700 of operations performed by a battery management system, in accordance with one embodiment of the present invention. In one embodiment, for phosphate Lithium ion battery cells, a voltage of a cell increases rapidly after the cell reaches a certain voltage threshold (called "voltage jump"). As such, the flowchart 700 can be implemented to charge the phosphate Lithium ion battery cells by reducing a charging current when a "voltage jump" occurs, in one embodiment. In one embodiment, the command converter 426 can be configured, such that the battery management system in FIG. 4 operates in a way shown in flowchart 700. FIG. 7 is described in combination with FIG. 3 and FIG. 4.

In the example of FIG. 7, the battery management system first charges the battery pack 304 in a standard constant current charging mode CC0, in one embodiment. The battery management system charges the battery pack 304 in light constant current charging modes CCn(n=1, 2, ..., max) if any over-voltage condition occurs, in one embodiment. In one embodiment, an over-voltage condition occurs if the highest cell voltage of the battery pack 304 is greater than a preset voltage V3 (e.g., 4.3V for Lithium Ion cells). If there is a "voltage jump", the battery management system charges the battery pack 304 in a light constant current charging mode (e.g., CCmax with a minimum charging current Imax (I0>I1>I2> ... >Imax)), in one embodiment. In one embodiment, a "voltage jump" is detected when an increase on a voltage (e.g., an individual cell voltage or an average cell voltage) over a time period $\Delta V/\Delta t$ is greater than a threshold level $\Delta th$. If an average cell voltage of the battery pack 304 is greater than a preset voltage level V2 (e.g., 4.2V for Lithium Ion cells), the battery management system charges the battery pack 304 in a constant voltage charging mode (e.g., a standard constant voltage charging mode CV0), in one embodiment. The battery management system also performs protection check, in one embodiment.

The battery management system starts charging the battery pack 304 and n (which represents different constant current charging modes) is initialized to 0 in block 702. Constant current charging mode CCn is enabled by the control signal 350 in block 704. For example, when n is set to 0, a standard current charging mode CC0 will be enabled. When n is between 1 and max, a light constant current charging mode CCn (n=1, 2, ..., max) will be enabled. A protection check is performed in block 706. For example, the command converter 426 receives monitoring signals from the monitoring circuit 424 and determines whether any undesirable condition (e.g., over-voltage, over-current, and over-temperature) has occurred, in one embodiment. If there is any undesirable condition, the flowchart goes to block 728 to terminate battery charging (charging termination mode). As such, the command converter 426 will switch off the charging switch 430 to terminate battery charging. If there is no undesirable condition, the flowchart goes to block 708.

In block 708, a highest cell voltage is compared with a preset voltage V3, for example, by the command converter 426, in order to determine if there is any over-voltage condition. If the highest cell voltage is greater than the preset voltage V3 (which indicates that there is an over-voltage condition), the flowchart goes to block 710. In block 710, n is increased by 1. The flowchart then goes to block 712 to perform a "voltage jump" check. If the highest cell voltage is less than the preset voltage V3 (which indicates that there is no over-voltage condition), the flowchart goes to block 712 directly.

In block 714, if an increase on a voltage (e.g., an individual cell voltage or an average cell voltage) over a time period $\Delta V/\Delta t$ is less than a threshold level $\Delta th$, the flowchart returns to block 704. Any repetitive description following block 704 that has been described above will be omitted herein for purposes of clarity and brevity.

If the increase on a voltage (e.g., an individual cell voltage or an average cell voltage) over a time period $\Delta V/\Delta t$ is greater than the threshold level $\Delta th$, the battery pack 304 will be charged under a light constant current charging mode (e.g., CCmax) in block 716. In one embodiment, the control signal 350 will control the adapter 302 to output a constant charging current (Imax) to charge the battery 304.

In block 720, a constant voltage charging mode (CV) check is performed. More specifically, an average voltage of the battery pack 304 is compared with a preset voltage level V2 to determine whether the constant voltage charging mode (e.g., a standard constant voltage charging mode CV0) can be enabled. In block 720, if the average cell voltage of the battery pack 304 is less than the preset voltage level V2, which indicates that the battery pack 304 can still be charged in a light constant current mode, the flowchart returns to block 716.

In block 720, if the average cell voltage of the battery pack 304 is greater than the preset voltage level V2, the battery pack 304 will be charged under a constant voltage charging mode (e.g., a standard constant voltage charging mode CV0) in block 722. The flowchart goes to block 724 to determine if all the cells are fully charged.

In block 724, if all the cells are fully charged, the charging process is terminated in block 728 (charging termination mode). Otherwise, the flowchart returns to block 722 to continue charging the battery pack 304 under a constant voltage charging mode.

As described in relation to FIG. 5-FIG. 7, the battery pack 304 is charged under multiple constant current charging modes (e.g., standard constant current charging mode CC0, light constant current charging mode CC1-CCmax) and a constant voltage charging mode (e.g., a standard constant voltage charging mode CV0), in one embodiment. Other charging methods can be implemented by configuring/programming the command converter 426. For example, the battery pack 304 can be charged under a constant current charging mode (e.g., a standard constant current charging mode CC0) and multiple constant voltage charging modes (e.g., standard constant voltage charging mode CV0, light constant voltage charging mode CV1-CVmax'), in one embodiment. The battery pack 304 can also be charged under multiple constant current charging modes (e.g., standard constant current charging mode CC0, light constant current charging mode CC1-CCmax) and multiple constant voltage charging modes (e.g., standard constant voltage charging mode CV0, light constant voltage charging mode CV1-CVmax'), in one embodiment.

Figure 8:
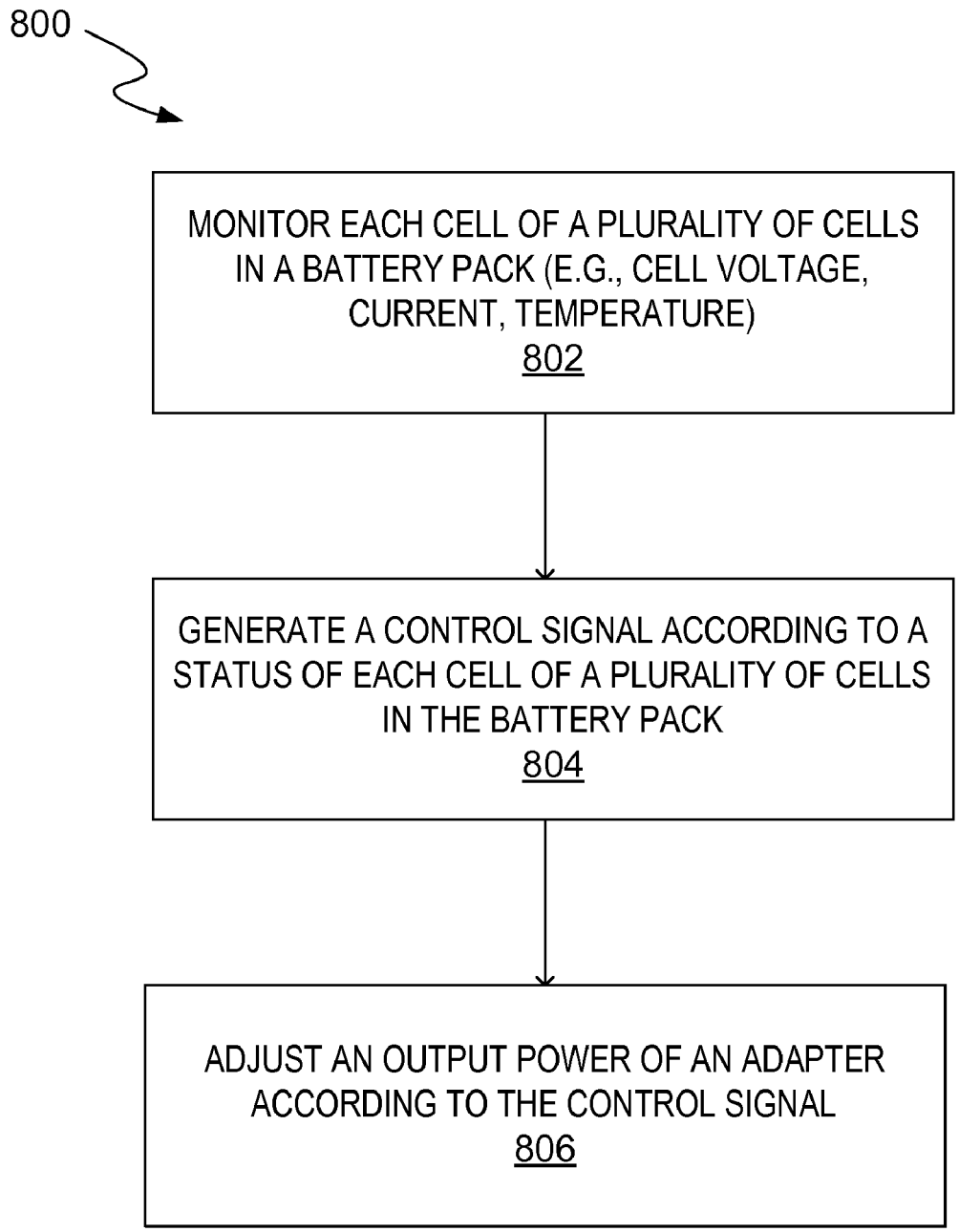
FIG. 8 shows a flowchart of operations performed by a battery management system, in accordance with one embodiment of the present invention.

FIG. 8 shows a flowchart 800 of operations performed by a battery management system, in accordance with one embodiment of the present invention. FIG. 8 is described in combination with FIG. 3 and FIG. 4.

As shown in FIG. 8, the battery management system monitors each cell of a plurality of cells in a battery pack 304 in block 802. For example, a monitoring circuit 424 monitors cell voltage, current, and temperature, etc., and generates a monitoring signal for each cell indicative of a status of each cell.

In block 804, the battery management system generates a control signal 350 according to the status of each cell of a plurality of cells in the battery pack 304. For example, the control signal 350 is generated according to monitoring signals 490_1-490_3, 492, and 494 as shown in FIG. 4.

In block 806, the battery management system adjusts an output power of an adapter 302 according to the control signal 350. For example, the battery management system adjusts the output power of the adapter 302 by controlling a duty cycle of a pulse width modulation signal in the adapter 302.

Accordingly, a battery management system is provided. In one such embodiment, a battery pack is able to adjust an output power of an adapter directly by a control circuit integrated in the battery pack. Advantageously, the output power of the adapter is adjusted according to individual cell status. Therefore, multiple charging modes can be enabled according to individual cell status, in one embodiment. As such, battery charging can be terminated when all the cells are fully charged and any undesirable condition can be avoided, in one embodiment.

In one embodiment, multiple charging modes can also be enabled according to battery pack status. For example, a standard constant current charging mode can be enabled at the beginning of charging. A light constant current charging mode can be enabled when the battery pack voltage is greater than a first threshold, in one embodiment. A light constant current charging mode can also be enabled when an increase on a battery voltage over a time period is greater than a second threshold. A constant voltage charging mode can be enabled when the battery pack voltage is greater than a third threshold, in one embodiment.

Figure 9:
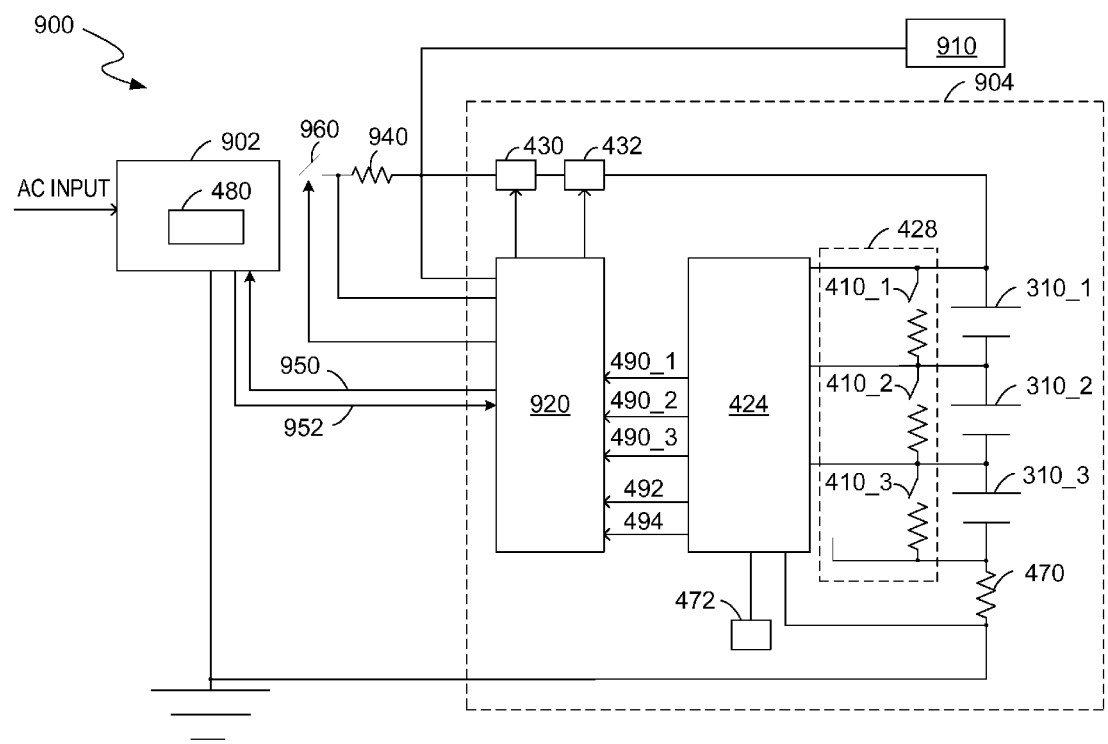
FIG. 9 shows a block diagram of a power management system, in accordance with one embodiment of the present invention.

FIG. 9 shows a block diagram of a power management system 900, in accordance with one embodiment of the present invention. Elements labeled the same as in FIG. 4 have similar functions and will not be detailed described herein.

The battery management system 900 includes an adapter 902 operable for charging a battery pack 904 and powering a system load 910. The adapter 902 can charge the battery pack 904 and power the system load 910 simultaneously, in one embodiment. The adapter 902 can generate a power recognition signal 952 indicative of a maximum adapter power to a battery controller 920 in the battery pack 904, and can receive a control signal 950 from the battery controller 920. The control signal 950 can be similar to the control signal 350 in FIG. 4. The power recognition signal 952 can be a voltage signal and the voltage level of the power recognition signal 952 can indicate a maximum available power from the adapter 902. The battery pack 904 includes the battery controller 920 and a monitoring circuit 424, in one embodiment. The battery controller 920 can receive the power recognition signal 952 from the adapter 902 and can generate the control signal 950 to adjust an output power of the adapter 902 according to a status of the battery pack 904 and a status of the system load 910. More specifically, the control signal 950 can be an analog control signal or a digital control signal. The control signal 950 can be used to adjust a duty cycle of a pulse width modulation (PWM) signal generated by a PWM signal generator 480 in the adapter 902 so as to adjust the output power of the adapter 902. In one embodiment, the power recognition signal 952 and the control signal 950 are transferred through a single bus/line. In another embodiment, the power recognition signal 952 and the control signal 950 are transferred through two signal buses/lines respectively.

The battery controller 920 can monitor an output current from the adapter 902 by monitoring a voltage on a sensing resistor 940. For example, a differential amplifier (not shown in FIG. 9) can be coupled to the sensing resistor 940 to amplify the voltage on the sensing resistor 940 and to generate an analog monitoring signal indicative of the output current from the adapter 902. An A/D converter (not shown in FIG. 9) can be coupled to the differential amplifier for converting the analog monitoring signal to a digital signal indicative of the output current from the adapter 902.

The battery controller 920 can also receive monitoring information of the battery pack 904 from the monitoring circuit 424. As described in relation with FIG. 4, the monitoring circuit 424 can monitor a cell status (e.g., cell voltage, cell current, cell temperature, and cell capacity) for each individual cell 310_1-310_3, and protect each cell 310_1-310_3 from any undesirable conditions (e.g., over-voltage, over-current, over-temperature, and over-charge), in one embodiment. The monitoring circuit 424 also monitors a battery current (e.g., a battery charging current) via a sensing resistor 470 and generates a monitoring signal 492 indicating a level of the battery current. The battery controller 920 can receive the monitoring information from the monitoring circuit 424. Advantageously, the battery controller 920 can calculate the total power/current drawn by the system load 910 according to a difference between the output current from the adapter and the battery charging current.

Advantageously, the battery controller 920 can adjust the output power of the adapter 902 according to the status of the battery pack 904 (e.g., the charging current of the battery pack 904 or the power used to charge the battery pack 904) and the status of the system load 910 (e.g., the current flowing to the system load 910 or the total power for powering the system load 910). In other words, the output power of the adapter 910 can be dynamically and automatically adjusted according to the system needs and the battery needs/status. For example, if the battery pack 904 is required to be charged in a constant charging current mode CC1, the battery controller 920 can adjust the control signal 952 such that the battery pack 904 is charged by a constant charging current I1 while the system load 910 still receives enough power and operates properly. The battery controller 920 can operate in a way similar to the steps as described in relation to FIG. 5-FIG. 7, in one embodiment.

In one embodiment, the battery controller 910 adjusts the charging current of the battery pack 904 according to the output power of the adapter 902, e.g., according to the monitoring signal indicative of the output current of the adapter 902. For example, the monitoring signal indicative of the adapter output current can be generated by monitoring the sensing resistor 940. In one embodiment, when the battery controller 920 detects that the output power of the adapter reaches the maximum adapter power (e.g., when the monitoring signal indicative of the output current of the adapter is equal to or greater than a predetermined threshold), the battery controller 920 can decrease/cut off the charging current of the battery pack 904 in order to ensure enough power to be delivered to the system load 910 such that the system load 910 can operate properly. In one embodiment, the battery controller 920 can switch off the charging switch 430 to cut off the charging current. In another embodiment, since the charging switch 430 can be enabled by a pulse width modulation signal generated by the battery controller 920, the battery controller 920 can reduce the charging current by decrease the duty cycle of the pulse width modulation signal which controls the charging switch 430. Advantageously, the battery controller 920 can dynamically allocate power between the system load 910 and the battery pack 904 based on the output power of the adapter 902, in one embodiment.

In one embodiment, the battery controller 920 generates a signal to switch off a switch 960 which is coupled between the adapter 902 and the battery pack 904 if an undesirable condition (or a fault condition) of the adapter 920 occurs. For example, when the battery controller 920 detects that an output voltage of the adapter 902 is greater than a predetermined threshold, the switch 960 can be switched off to protect the battery pack 904 and the system load 910.

Figure 10:
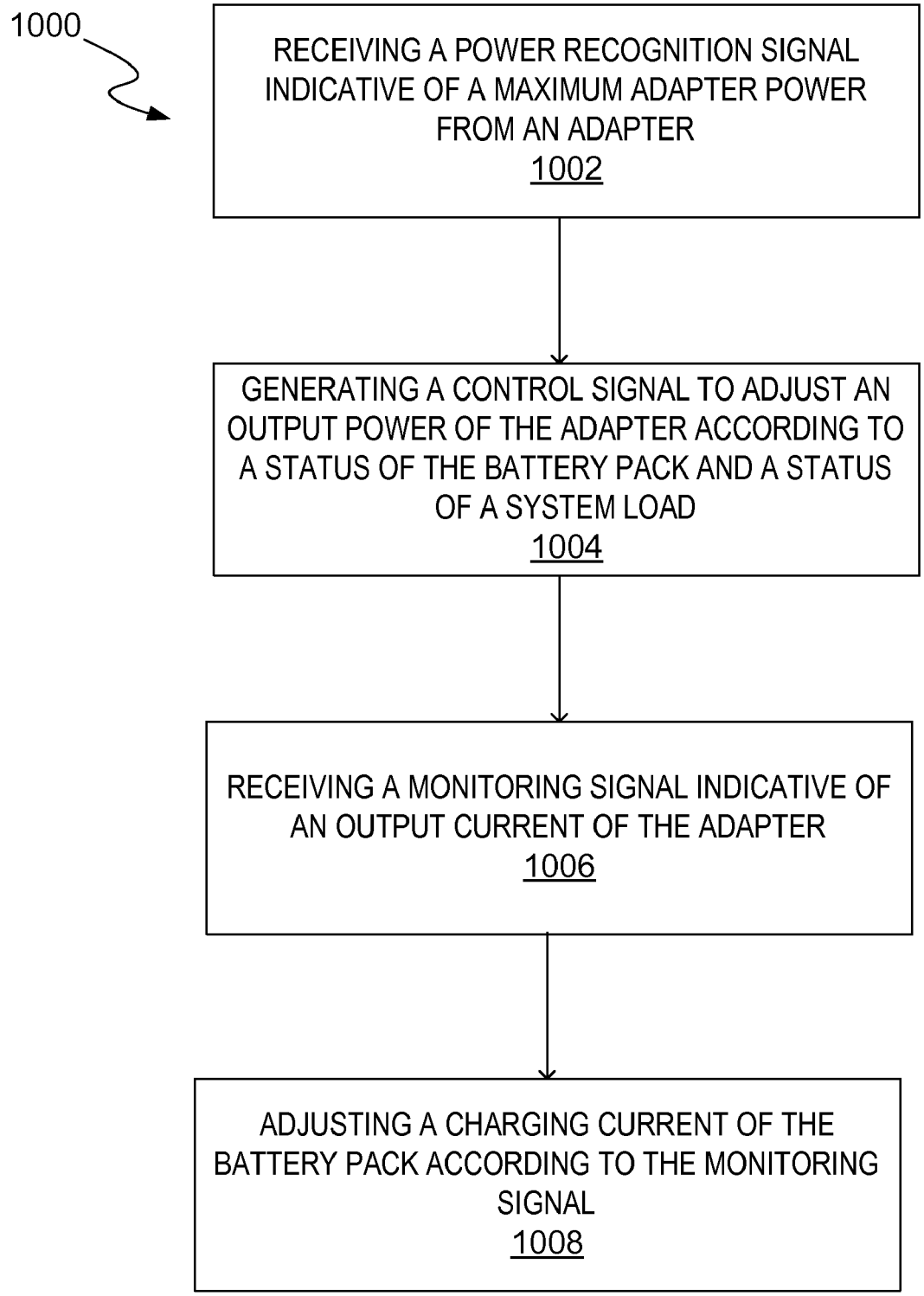
FIG. 10 shows a flowchart of operations performed by a battery controller, in accordance with one embodiment of the present invention.

FIG. 10 shows a flowchart 1000 of operations performed by a battery controller, e.g., the battery controller 920, in one embodiment. FIG. 10 is described in combination with FIG. 9.

In block 1002, a power recognition signal 952 indicative of a maximum adapter power is received, e.g., from the adapter 902. In block 1004, a control signal 950 is generated, e.g., by the battery controller 920, to adjust an output power of the adapter 902 according to a status of the battery pack 904 and a status of a system load 910 powered by the adapter 902. In block 1006, a monitoring signal indicative of an output current of the adapter 902 is received, e.g., by the battery controller 920. In block 1008, the charging current of the battery pack 904 can be adjusted according to the monitoring signal indicative of the output current of the adapter 902. Advantageously, in one embodiment, when the battery controller 920 detects that the output power of the adapter reaches the maximum adapter power (e.g., when the monitoring signal indicative of the output current of the adapter is equal to or greater than a predetermined threshold), the battery controller 920 can decrease/cut off the charging current of the battery pack 904 in order to ensure enough power to be delivered to the system load 910 such that the system load 910 can operate properly.

Figure 11:
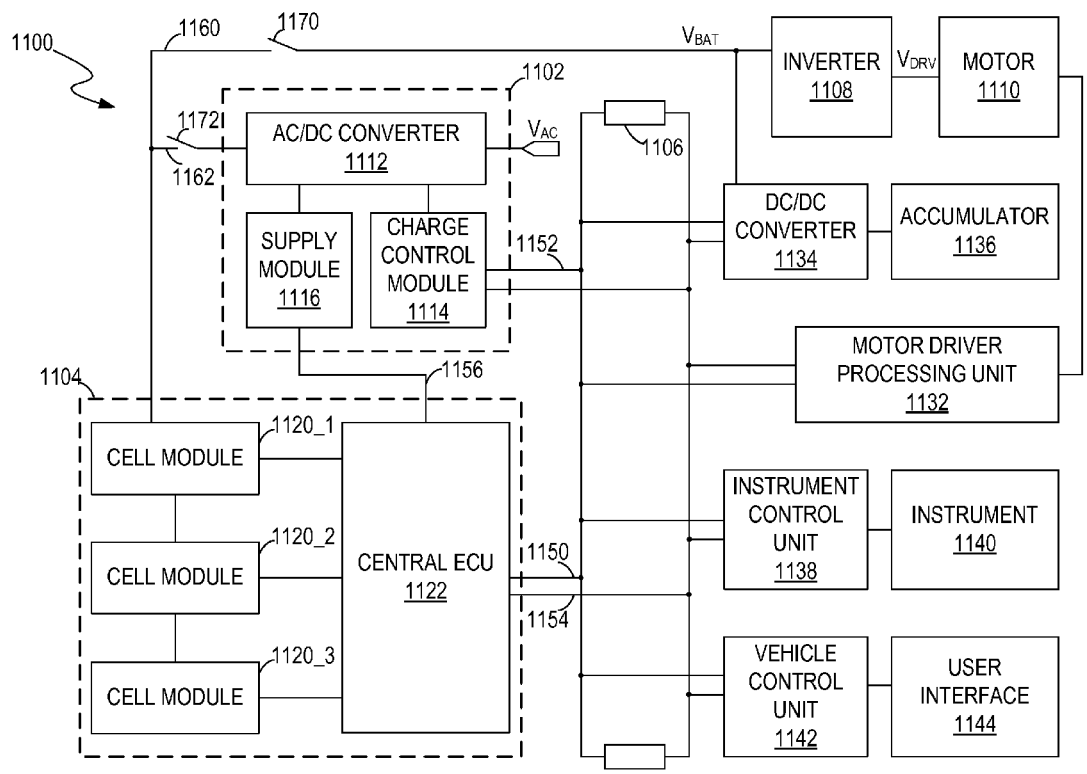
FIG. 11 shows a block diagram of a vehicle electronic system with battery management functions, in accordance with one embodiment of the present invention.

FIG. 11 shows a block diagram of a vehicle electronic system 1100 with battery management functions, in accordance with one embodiment of the present invention. FIG. 11 is described in combination with FIG. 3, FIG. 4 and FIG. 9. In one embodiment, the vehicle electronic system 1100 is operable for controlling operations of a vehicle. The vehicle can be an electric vehicle (EV) or a hybrid electric vehicle (HEV). The vehicle electronic system 1100 includes a motor 1110, vehicle management components, and power management components. The vehicle management components include a motor driver processing unit (MPU) 1132, a direct current (DC) to DC converter 1134, an instrument control unit (ICU) 1138, and a vehicle control unit (VCU) 1142. The power management components include a charger 1102 and a battery pack 1104.

The vehicle electronic system 1100 further includes a vehicle bus 1106 for interconnecting the components in the vehicle electronic system 1100, e.g., including the vehicle management components and the power management components, and for transferring data information among such components in accordance with one or more vehicle bus protocols. The vehicle bus protocols include, but are not limited to, a Controller Area Network (CAN) protocol, a Vehicle Area Network (VAN) protocol, a Local Interconnect Network (LIN) protocol, and a FlexRay protocol. In the example of FIG. 11, the vehicle bus 1106 can be a CAN bus using the CAN protocol. The CAN protocol predetermines formats of messages and rules for exchanging those messages according to a CAN standard. As such, during a start-up duration, the components coupled to the vehicle bus 1106, e.g., the charger 1102 and the battery pack 1104, determine whether they support the CAN protocol, e.g., whether they can follow the CAN standard to exchange messages with each other through the vehicle bus 1106. By way of example, if both the charger 1102 and the battery pack 1104 support the CAN standard, a handshake between the charger 1102 and the battery pack 1104 is established.

The instrument control unit 1138 controls instruments 1140 of the vehicle coupled to the instrument control unit 1138. The instruments 1140 include, but are not limited to, a speedometer, a tachometer, an odometer, a battery status gauge, a low battery lamp, and a hand-brake lamp.

The vehicle control unit 1142 coupled to a user interface 1144 interacts with a user via the user interface 1144 to control the components coupled to the vehicle bus 1106. For example, when the vehicle is started, the components in the vehicle electronic system 1100 perform self-examination and generate result data indicating whether an internal error is found during the self-examination. The vehicle bus 1106 transfers the result data to the vehicle control unit 1142. If the result data indicates an internal error is found, e.g., when the battery pack 1104 is powered off, the vehicle control unit 1142 feedbacks the result information to the user interface 1144 or sends a control command to the instrument control unit 1138 to show a warning on a corresponding instrument. If the result data indicates that all the components pass the self-examination, e.g., no errors are found, the vehicle control unit 1142 sends a start command to each component. As a result, the vehicle electronic system 1100 is started.

Furthermore, the vehicle control unit 1142 monitors states of the components coupled to the vehicle bus 1106 by receiving sensing data from such components. The vehicle control unit 1142 interacts with the user interface 1144 and sends control commands to control the components accordingly. For example, the instrument control unit 1138 can display various sensing information, e.g., a speed of the vehicle, a rotate speed of the motor 1110, a battery capacity, etc., on panels of the corresponding instruments according to control commands from the vehicle control unit 1142.

The motor driver processing unit 1132 controls the motor 1110, e.g., according to instructions generated by the vehicle control unit 1142. For example, the motor driver processing unit 1132 is capable of starting and stopping the motor 1110, selecting a rotation direction of the electric motor, selecting and regulating a rotation speed of the motor 1110, regulating a torque, and protecting the motor 1110 against overloads and faults. Moreover, the motor driver processing unit 1132 forwards motor-state data indicating a status of the motor 1110, e.g., a rotation speed of the motor 1110, to the vehicle control unit 1142. Accordingly, the vehicle control unit 1142 controls the instrument control unit 1138 to show the rotation speed on the tachometer.

In one embodiment, the battery pack 1104 includes multiple cell modules such as cell modules 1120_1, 1120_2 and 1120_3. Although three cell modules are shown in the example of FIG. 11, other number of cell modules can be included in the battery pack 1104. Each of the cell modules includes a respective predetermined number of battery cells such as lithium cells, lead-acid cells, NiCD/NiMH cells, or LiFePO4 cells.

The battery pack 1104 is capable of operating in a charging mode and a discharging mode. The battery pack 1104 is coupled to the motor 1110 via a discharging path 1160 and an inverter 1108. In the example of FIG. 11, the motor 1110 is an alternating current (AC) motor. When the vehicle is started, the battery pack 1104 is switched to the discharging mode, e.g., by turning on a discharging switch 1170 to conduct the discharging path 1160. In the discharging mode, the cell modules 1120_1-1120_3 coupled in series generate a battery voltage $V_{BAT}$. The inverter 1108 converts the battery voltage $V_{BAT}$ to an AC voltage $V_{DRV}$ to drive the motor 1110. The motor 1110 receives electric energy from the battery pack 1104 to produce mechanical energy, which further drives wheels or propellers of the vehicle. The battery pack 1104 stays in the discharging mode during the run time of the motor 1110. Alternatively, the motor 1110 can be a DC motor driven by a DC voltage, such that the inverter 1108 is removed or substituted by a DC/DC converter.

In one embodiment, the DC to DC converter 1134 coupled to the discharging path 1160 is operable for providing power to the components in the vehicle electronic system 1100. More specifically, when the battery pack 1104 operates in the discharging mode, the DC/DC converter 1134 converts the voltage $V_{BAT}$ from the battery pack 1104 to a driving voltage, e.g., a 12 volt DC voltage, to drive the components contained in the vehicle electronic system 1100 and to charge an accumulator 1136 coupled to the DC/DC converter 1134. When the vehicle is stalled, the discharging path 1160 is disabled, e.g., by turning off the discharging switch 1170, to terminate the discharging mode. As such, the DC/DC converter 1134 stops providing power to the components of the vehicle electronic system 1100. Then, some devices in the vehicle can be driven by driving power generated by the accumulator 1136. For example, lights of the vehicle can be turned on even if the vehicle is stalled.

The battery pack 1104 further includes a central electric control unit (ECU) 1122 coupled to the cell modules 1120_1-1120_3. The central ECU 1122 can include a processor such as a central processing unit (CPU), a microprocessor, a digital signal processor, or any other such device that can read and execute programming instructions, and can also include a machine-readable medium for storing machine-executable data and instructions. In one embodiment, the processor of the central ECU 1122 executes machine-executable instructions stored in the machine-readable medium to control the cell modules 1120_1-1120_3 and exchange data messages with the vehicle bus 1106.

The charger 1102 coupled to the battery pack 1104 via a charging path 1162 is operable for charging the battery pack 1104. In one embodiment, the charger 1102 includes an AC/DC converter 1112, a charge control module 1114, and a supply module 1116. When the vehicle is stalled and the AC/DC converter 1112 is connected to a power outlet or a dedicated charging station which provides an AC power supply $V_{AC}$, the battery pack 1104 is switched to the charging mode, e.g., by turning on a charge switch 1172 to enable the charging path 1162. In the charging mode, the AC/DC converter 1112 receives the AC power supply $V_{AC}$ to generate charging power to charge the cells contained in the battery pack 1104. The charging power has a charging voltage at the charging path 1162 and a charging current flowing through the charging path 1162.

The charge control module 1114 coupled to the vehicle bus 1106 controls the AC/DC converter 1112 and exchanges data messages with the vehicle bus 1106. In one embodiment, the charge control module 1114 generates an authentication signal 1152 indicating a maximum charging voltage and a maximum charging current of the charger 1102. The central ECU 1122 of the battery pack 1104 receives the authentication signal 1152 via the vehicle bus 1106 and determines whether the charger 1102 is suitable for charging the battery pack 1104 accordingly.

By way of example, the machine-readable medium of the central ECU 1122 stores charging data indicating multiple charging modes (e.g., CC0, CC1 . . . CCmax and CV0, CV1 . . . CVmax') associated with the battery pack 1104. The charging data includes data indicating a desired charging voltage and a desired charging current associated with each of the charging modes. In one embodiment, if the maximum charging voltage of the charger 1102 is greater than the desired charging voltage for each of the charging modes and the maximum charging current of the charger 1102 is greater than the desired charging current for each of the charging modes, the central ECU 1122 enables the charging operation, e.g., by generating a control signal 1150.

In one embodiment, if the maximum charging voltage is less than a desired charging voltage for a charging mode or if the maximum charging current is less than a desired charging current for a charging mode, the central ECU 1122 generates a charge termination signal 1154. The charge control module 1114 receives the charge termination signal 1154 via the vehicle bus 1106 and terminates the operation of the AC/DC converter 1112 accordingly.

In one embodiment, the central ECU 1122 monitors a status of each cell in the cell modules 1120_1-1120_3 and generates the control signal 1150 indicating desired charging power accordingly. More specifically, the central ECU 1122 can select a charging mode for the cells in the battery pack 1104 according to a status of the individual cell. In one embodiment, the control signal 1150 includes charge control data indicating a reference voltage V_REF and a reference current I_REF associated with the selected charging mode.

The charge control module 1114 receives the control signal 1150 via the vehicle bus 1106 and adjusts the output power of the AC/DC converter 1112 accordingly. For example, the charge control module 1114 generates a pulse-width modulation (PWM) signal according to V_REF and I_REF, which is further described in relation to FIG. 13 and FIG. 14.

Advantageously, if the maximum charging power provided by the charger 1102 is suitable for the battery pack 1104, the charger 1102 can charge the battery cells according to the control signal 1150 provided by the battery pack 1104. Since the charging mode for charging the battery pack 1104 is determined by the battery pack 1104 rather than the charger 1102, the charger 1102 is adaptable for charging different types of battery cells. Moreover, different charging modes can be enabled according to an individual cell status. Thus, as discussed in relation to FIG. 3, FIG. 4 and FIG. 9, all the cells can be fully charged and undesirable conditions can be avoided. As such, the battery life is extended, which increases the power efficiency of the vehicle electronic system 1100 and thus reduces the reliance on fossil fuels, pollutants and greenhouse gas emissions.

In one embodiment, the central ECU 1122 further provides battery-state data indicating a status of the battery pack 1104. For example, the battery-state data indicates a battery temperature, a battery capacity, and a state of charge (SOC) of the battery pack 1104. The vehicle bus 1106 transfers the battery-state data to the vehicle control unit 1142. Accordingly, the vehicle control unit 1142 controls the instrument control unit 1138 to display the battery status on one or more panels of the instruments 1140, e.g., the battery status gauge.

In one embodiment, the vehicle needs to be stalled when the charger 1102 is connected to the power outlet or the charging station for charging the battery pack 1104. In other words, the DC/DC converter 1134 stops providing power to the components of the vehicle electronic system 1100 when the battery pack 1104 is switched to the charging mode, e.g., by turning on a charging switch 1172 to enable the charging path 1162. Advantageously, the supply module 1116 of the charger 1102 coupled to the central ECU 1122 can provide a supply voltage 1156 to drive the central ECU 1122 in the charging mode. That is, the central ECU 1122 has two power supplies for the charging mode and the discharging mode respectively. If the battery pack 1104 operates in the discharging mode when the vehicle is started, the central ECU 1122 is powered by a driving voltage converted by the battery voltage $V_{BAT}$. If the battery pack 1104 operates in the charging mode when the vehicle is stalled, the central ECU 1122 is powered by the supply voltage 1156 provided by the supply module 1116. Thus, although the vehicle is stalled in the charging mode, the central ECU 1122 still functions properly. The operation of the battery pack 1104 is further described in relation to FIG. 12. The vehicle electronic system 1100 can include other components, and is not limited to the example in FIG. 11.

Figure 12:
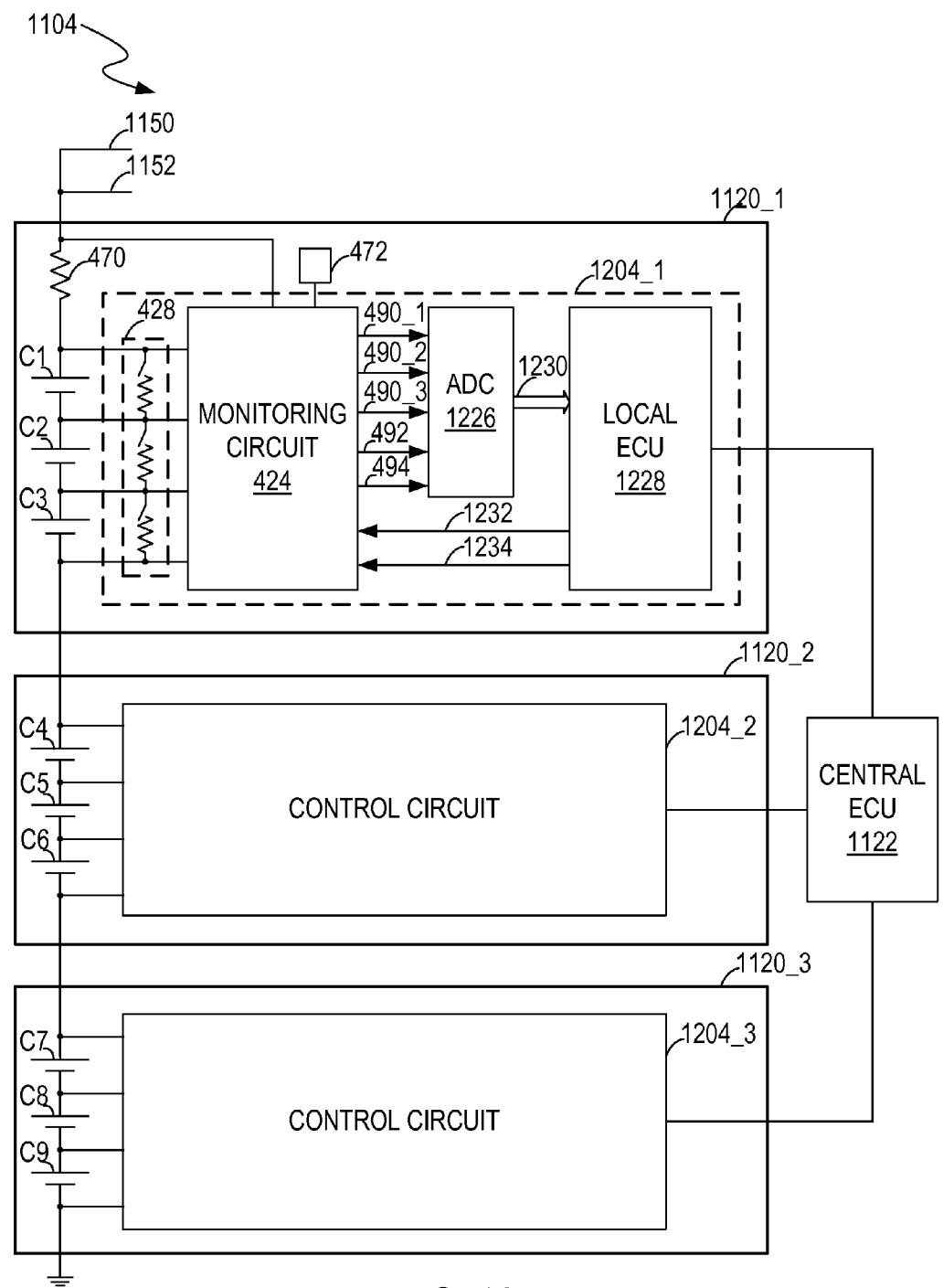
FIG. 12 illustrates a block diagram of a battery pack, in accordance with one embodiment of the present invention.

FIG. 12 illustrates a block diagram of the battery pack 1104, in accordance with one embodiment of the present invention. Elements labeled the same as in FIG. 4 and FIG. 11 have similar functions. FIG. 12 is described in combination with FIG. 3, FIG. 4, FIG. 9 and FIG. 11.

In one embodiment, each of the cell modules 1120_1-1120_3 includes a respective number of cells and a respective control circuit. For example, the cell module 1120_1 includes cells C1, C2 and C3, and includes a control circuit 1204_1; the cell module 11202 includes cells C4, C5 and C6, and includes a control circuit 1204_2; the cell module 1120_3 includes cells C7, C8 and C9, and includes a control circuit 1204_3. Although three cells in each of the cell modules are shown in the example of FIG. 12, other number of cells can be included in each of the cell modules 1120_1-1120_3.

In one embodiment, the control circuit 1204_1 includes the cell balancing circuit 428, the monitoring circuit 424, an analog to digital converter (ADC) 1226, and a local ECU 1228. The monitoring circuit 424 monitors a cell status (e.g., cell voltage, cell current, cell temperature, and cell capacity) for each individual cell C1 to C3, and generates multiple monitoring signals accordingly. For example, the monitoring circuit 424 generates monitoring signals 490_1-490_3 indicating voltages of the cells C1-C3, a monitoring signal 492 indicating a battery current, a monitoring signal 494 indicating a temperature of the cell module 1120_1, and monitoring signals (not shown) indicating capacities of cells C1-C3.

The ADC 1226 coupled to the monitoring circuit 424 converts the monitoring signals 490_1-490_3, 492 and 494 to multiple digital signals 1230. The local ECU 1228 coupled to the ADC 1226 receives the digital signals 1230 to obtain the status information of the individual cell C1-C3. Similar to the central ECU 1122, the local ECU 1228 includes a processor and a machine-readable medium, in one embodiment. The local ECU 1228 executes machine-executable instructions to control the cells C1-C3 in the corresponding cell module 1204_1 according to the digital signals 1230. More specifically, in one embodiment, the local ECU 1228 determines whether an undesirable condition of the cell module 1120_1 (e.g., over-voltage, over-current, over-temperature, and over-charge) occurs according to the status of the individual cell C1-C3. If the cell module 1120_1 undergoes an undesirable condition, the local ECU 1228 controls the monitoring circuit 424 through control commands 1232 to protect the cells C1-C3 from the undesirable condition. Furthermore, the local ECU 1228 determines a balance condition of the cells C1-C3 according to a status of the individual cell C1-C3. In one embodiment, the local ECU 1228 generates a local balance signal 1234 according to the balance condition. Accordingly, the balance circuit 428 balances the cells C1-C3.

The local ECU 1228 further exchanges data with the central ECU 1122. For example, the local ECU 1228 provides a status signal indicating the status of individual cell C1-C3 to the central ECU 1122. The central ECU 1122 can transfer control commands to the local ECU 1228 to control the cell module 1120_1.

The control circuit 1204_2 or 1204_3 has similar configurations as the control circuit 1204_1. As such, the central ECU 1122 can obtain the status information of individual cell C1-C9 according to the status signals provided by the cell modules 1120_1-1120_3. As described in relation to FIG. 11, the central ECU 1122 generates the control signal 1150 to adjust the output power of the charger 1102 according to the status of individual cell C1-C9.

In one embodiment, the central ECU 1122 determines a balance condition of the cells C1-C9 according to the status of the individual cell C1-C9. The central ECU 1228 further generates multiple central balance signals for the cell modules 1120_1-1120_3 respectively according to the balance condition. Each of the central balance signals is transferred to a corresponding balance circuit through a corresponding local ECU. As such, the balance circuits of the cell modules 1120_1-1120_3 balance the cells C1-C9 accordingly.

Advantageously, the cell modules 1120_1-1120_3 can be placed in different battery boxes respectively and each cell module includes a respective local ECU to manage operations of cells in each cell module. As such, although the battery pack 1104 may have a relatively large number of battery cells, wire connections between different battery boxes and the central ECU 1122 can be simplified, which reduces the complexity of the battery pack 1104. Moreover, the local ECU operates to manage cells in a corresponding cell module and the central ECU operates to manage cells in all the cell modules. As such, the workloads of both the local ECU and the central ECU are in a reasonable range, which can decrease the operation voltage of the local and central ECUs. Thus, the power consumption of the battery pack 1104 is decreased. Moreover, the cooperation between the local ECUs and the central ECU 1122 increases the efficiency of the power management components.

Figure 13:
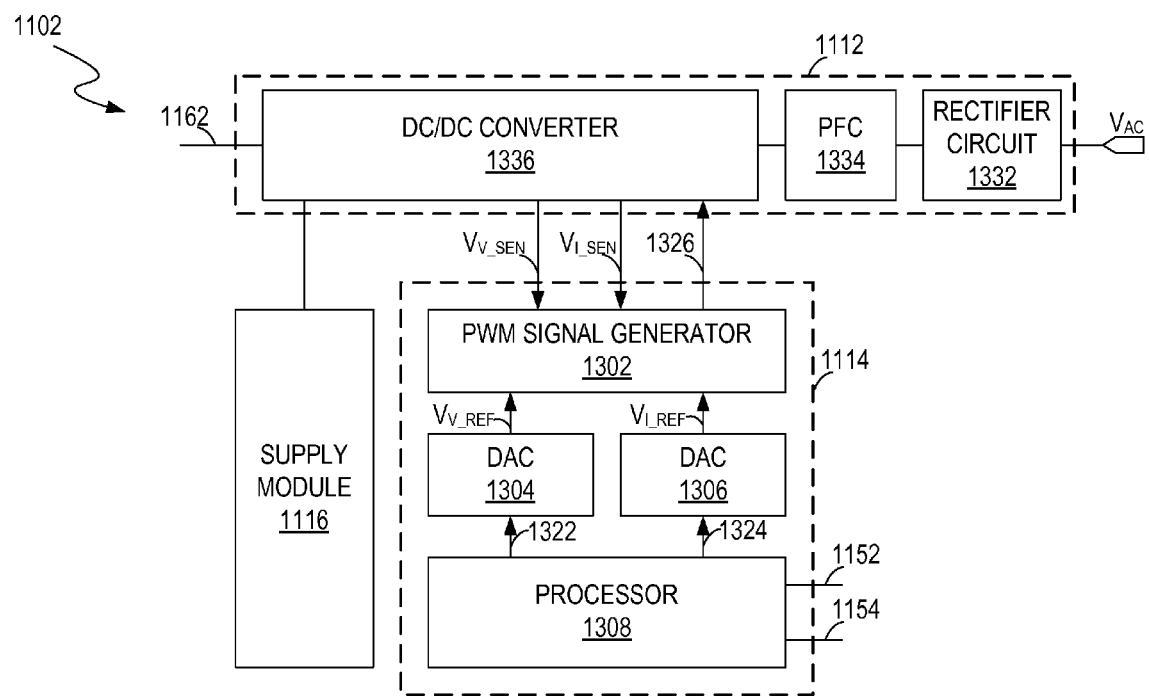
FIG. 13 illustrates an example of a block diagram of a charger, in accordance with one embodiment of the present invention.

FIG. 13 illustrates an example of a block diagram of the charger 1102, in accordance with one embodiment of the present invention. Elements labeled the same as in FIG. 11 have similar functions. FIG. 13 is described in combination with FIG. 11. In the example of FIG. 13, the charger 1102 includes the AC/DC converter 1112, the charge control module 1114, and the supply module 1116.

The AC/DC converter 1112 converts input AC power to the charging power at the charging path 1162. In one embodiment, the AC/DC converter 1112 includes a rectifier circuit 1332, a power factor corrector (PFC) 1334, and a DC/DC converter 1336. The rectifier circuit 1332 can include a rectifier and a filter. The rectifier can be, but is not limited to, a half-wave rectifier, a full-wave rectifier, or a bridge rectifier. The rectifier circuit 1332 is operable for commutating the input AC voltage $V_{AC}$ to provide a rectified AC voltage $V_{REC}$.

The PFC 1334 adjusts a current $I_{REC}$ flowing from the rectifier circuit 1332 to the PFC 1334 to enable the current $I_{REC}$ to be approximately in phase with the voltage $V_{REC}$. In this way, the power factor of the AC/DC converter 1112 is corrected to improve the power efficiency of the AC/DC converter 1112. The DC/DC converter 1336 receives a pulse signal 1326, e.g., a PWM signal, from the charge control module 1114, and converts the rectified AC voltage $V_{REC}$ to a charging voltage accordingly. In one embodiment, the DC/DC converter 1336 can be a switch-mode converter such as a boost converter, a buck converter, a boost-buck converter, and a flyback converter. Thus, a level of the charging power at the charging path 1162, e.g., the charging current multiplied by the charging voltage, is determined by a duty cycle of the pulse signal 1326.

In one embodiment, the DC/DC converter 1336 is further operable for generating a voltage sense signal $V_{V\_SEN}$ indicating the charging voltage and a current sense signal $V_{I\_SEN}$ indicating the charging current. For example, the voltage sense signal $V_{V\_SEN}$ is proportional to the charging voltage and the current sense signal $V_{I\_SEN}$ is proportional to the charging current.

The charge control module 1114 is operable for generating the pulse signal 1326 according to the control signal 1150. In one embodiment, the charge control module 1114 includes a processor 1308, a digital to analog converter (DAC) 1304, a DAC 1306, and a PWM signal generator 1302. The processor 1308 can be a central processing unit (CPU), a microprocessor, a digital signal processor, or any other such device that can read and execute programming instructions. In one embodiment, the processor 1308 can execute machine-executable instructions stored in a machine-readable medium to generate the authentication signal 1152 and receive the control signal 1150. Moreover, the processor 1308 obtains the charge control data from the control signal 1150. As described in relation to FIG. 11, the charge control data includes data indicating the reference voltage V_REF associated with the charging voltage and a reference current I_REF associated with the charging current. The processor 1308 generates a digital reference voltage signal 1322 and a digital reference current signal 1324. The DAC 1304 can convert the digital reference voltage signal 1322 to a voltage signal $V_{V\_REF}$ indicating the reference voltage V_REF. For example, the voltage signal $V_{V\_REF}$ is proportional to the reference voltage V_REF. The DAC 1306 can convert the digital reference current signal 1324 to a voltage signal $V_{I\_REF}$ indicating the reference current I_REF.

The PWM signal generator 1302 coupled to the processor 1308 via the DACs 1304 and 1306 receives the voltage signal $V_{I\_REF}$, the voltage signal $V_{I\_REF}$, the voltage sense signal $V_{V\_SEN}$, and the current sense signal $V_{I\_SEN}$. Accordingly, the PWM signal generator 1302 adjusts the duty cycle of pulse signal 1326 to determine the level of the charging power. As a result, various charging modes can be achieved according to the control signal 1150 which is generated by the central ECU 1122 based on a status of the individual cell C1-C9. The operation of the PWM signal generator 1302 is further described in relation to FIG. 14. The charger 1102 can have other configurations, and is not limited to the example of FIG. 14.

Figure 1:
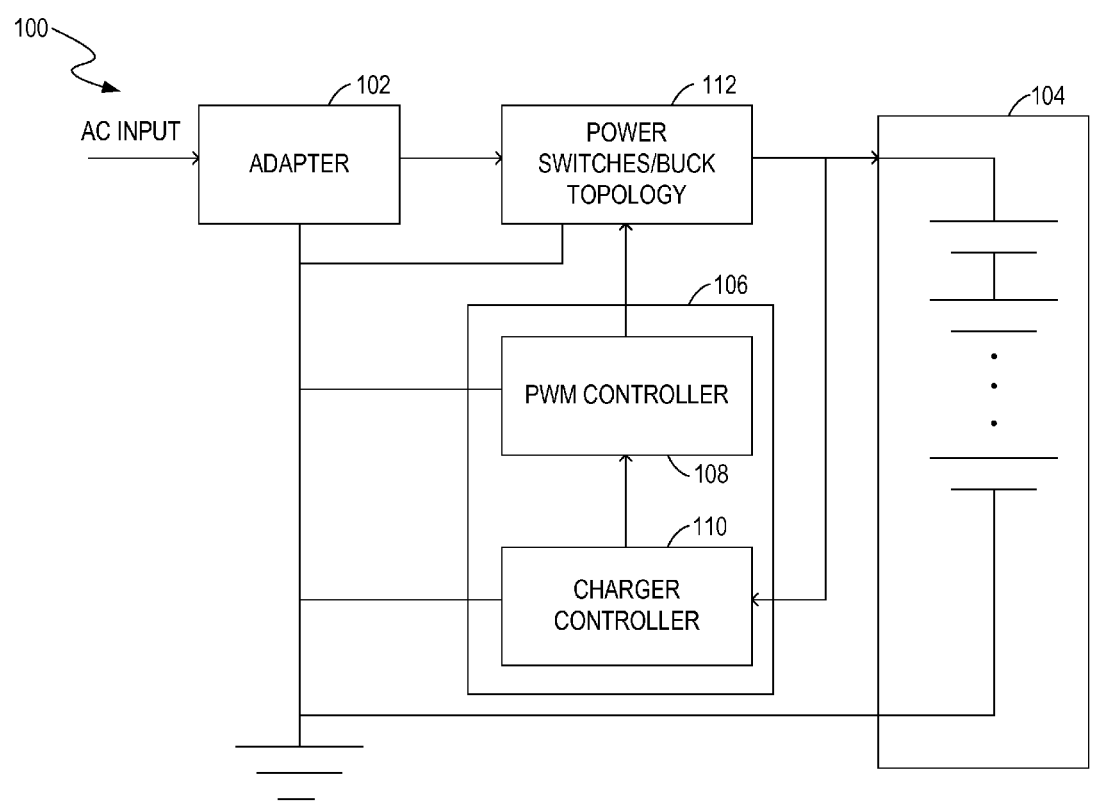
FIG. 1 shows a block diagram of a conventional battery charging circuit.
Figure 2:
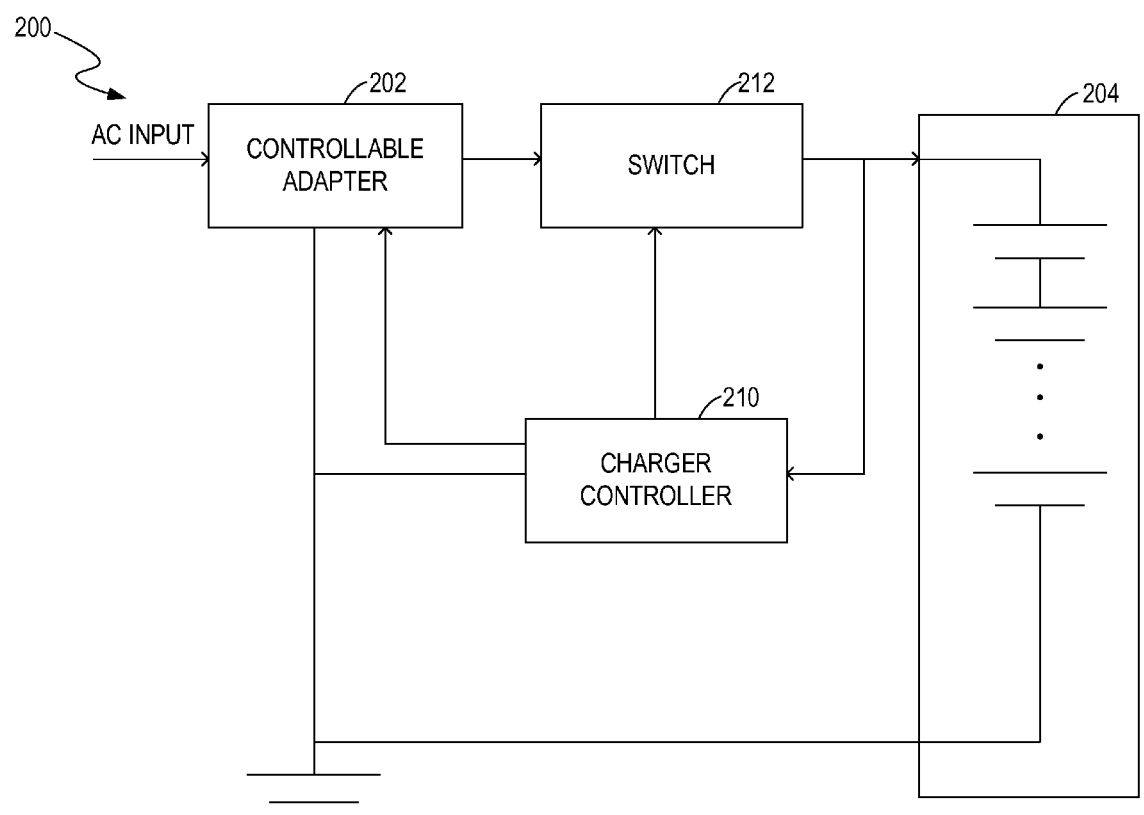
FIG. 2 shows a block diagram of a conventional charging circuit.

As shown in the example of FIG. 13, the charging mode is selected by the central ECU 1122 in the battery pack 1104. Thus, the conventional components for determining the charging mode, e.g., the charger controller 110 in FIG. 1 and the charger controller 210 in FIG. 2, can be removed from the charger 1102, which simplifies configurations of the charger 1102 and reduces the cost of the charger 1102.

Figure 14:
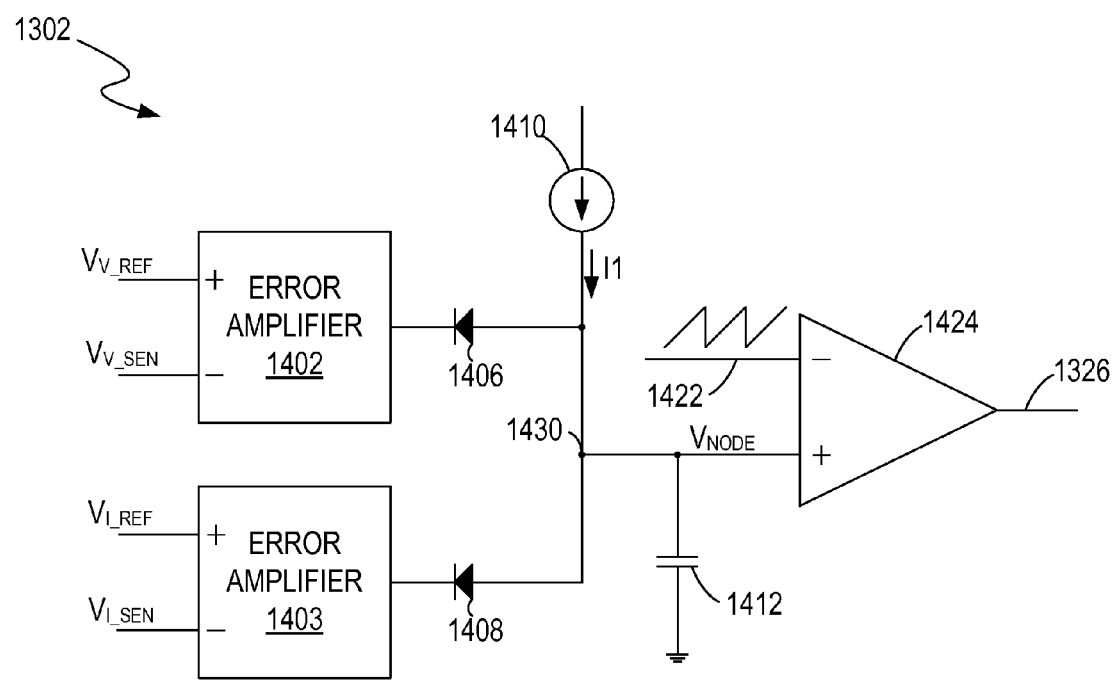
FIG. 14 illustrates an example of a diagram of a PWM signal generator, in accordance with one embodiment of the present invention.

FIG. 14 illustrates an example of a diagram of the PWM signal generator 1302, in accordance with one embodiment of the present invention. Elements labeled the same as in FIG. 13 have similar functions. FIG. 14 is described in combination with FIG. 11-FIG. 13. In the example of FIG. 14, the PWM signal generator 1302 includes a pair of error amplifiers 1402 and 1403, a pair of diodes 1406 and 1408, a current source 1410, a capacitor 1412, and a comparator 1424.

In one embodiment, the error amplifier 1402 is configured to compare the voltage sense signal $V_{V\_SEN}$ indicating the charging voltage to the voltage signal $V_{V\_REF}$ indicating the reference voltage V_REF. The error amplifier 1402 has an output terminal coupled to a node 1430 through the diode 1406. An output voltage of the error amplifier 1402 is determined by a comparison result of $V_{V\_SEN}$ and $V_{V\_REF}$. If $V_{V\_SEN}$ is equal to $V_{V\_REF}$, the output voltage is equal to zero. If $V_{V\_SEN}$ is greater than $V_{V\_REF}$, the output voltage has a negative value. If $V_{V\_SEN}$ is less than $V_{V\_REF}$, the output voltage has a positive value.

Likewise, the error amplifier 1403 is configured to compare the current sense signal $V_{I\_SEN}$ indicating the charging current to the voltage signal $V_{I\_REF}$ indicating the reference current I_REF. The error amplifier 1403 has an output terminal coupled to the node 1430 through the diode 1408. An output voltage of the error amplifier 1403 is determined by a comparison result of $V_{I\_SEN}$ and $V_{I\_REF}$. If $V_{I\_SEN}$ is equal to $V_{I\_REF}$, the output voltage is equal to zero. If $V_{I\_SEN}$ is greater than $V_{I\_REF}$, the output voltage has a negative value. If $V_{I\_SEN}$ is less than $V_{I\_REF}$, the output voltage has a positive value.

The current source 1410 coupled to the node 1430 is operable for generating a current I1. The capacitor 1412 coupled to the node 1430 provides a node voltage $V_{NODE}$ at the node 1430. The voltage $V_{NODE}$ varies according to a charge level of the capacitor 1412. For example, $V_{NODE}$ is increased if the capacitor 1412 is charged, and is decreased if the capacitor 1412 is discharged.

The comparator 1424 is operable for generating the pulse signal 1326, e.g., a PWM signal. The comparator 1424 has a positive terminal for receiving the node voltage $V_{NODE}$ at the node 1430 and has a negative terminal for receiving a sawtooth-wave voltage signal 1422. The comparator 1424 compares the sawtooth-wave voltage 1422 with the node voltage $V_{NODE}$ and generates the pulse signal 1326 according to a result of the comparison. In the example of FIG. 14, the duty cycle of the pulse signal 1326 is increased if the node voltage $V_{NODE}$ at the node 1430 is increased. Likewise, the duty cycle of PWM signal 1326 is decreased if the node voltage $V_{NODE}$ at the node 1430 is decreased.

In operation, the PWM signal generator 1302 can adjust the charging power to charge the battery pack in different charging modes by adjusting the duty cycle of the pulse signal 1326. Assume that the level of the charging power provided to the charging path 1162 is increased as the duty cycle of the pulse signal 1326 is increased. The PWM signal generator 1302 can enable DC/DC converter 1336 to charge the battery pack 1104 in a constant current (CC) mode in which the charging current is maintained to be constant and the charging voltage increases but is lower than V_REF. The central ECU 1122 provides the control signal 1150 containing charge control data indicating the reference voltage V_REF and the reference current I_REF. If the charging voltage is lower than the reference voltage V_REF, e.g., $V_{V\_SEN} < V_{V\_REF}$, the output voltage of the error amplifier 1402 is positive, thereby enabling the diode 1406 to be reverse biased.

Meanwhile, the error amplifier 1403 maintains the charging current to be approximately equal to the reference current I_REF. For example, if $V_{I\_SEN}$ is greater than $V_{I\_REF}$, indicating the charging current is greater than I_REF, the diode 1408 is forward-biased to absorb the current I1 and to discharge the capacitor 1412. As such, the node voltage $V_{NODE}$ is decreased to decrease the duty cycle of the pulse signal 1326. As a result, the level of the charging power is decreased to decrease the charging current. If $V_{I\_SEN}$ is less than $V_{I\_REF}$, indicating the charging current is less than I_REF, the diode 1408 is reverse-biased. The current I1 charges the capacitor 1412 to increase the node voltage $V_{NODE}$. As a result, the charging power is increased to increase the charging current. If $V_{I\_SEN}$ is equal to $V_{I\_REF}$, indicating the charging current is equal to I_REF, the diode 1408 enters a balance state to enable a current I2 which is less than I1 to flow through the diode 1408. Thus, the capacitor 1412 is charged by a current I3, e.g., I3=I1−I2, that is less than I1. Therefore, the level of the charging power is increased in a predetermined rate to satisfy a demand of increasing the charging voltage in the CC mode. The charge control module 1102 can operate to enable other charging modes such as a constant voltage mode and a pre-charge mode.

Figure 15:
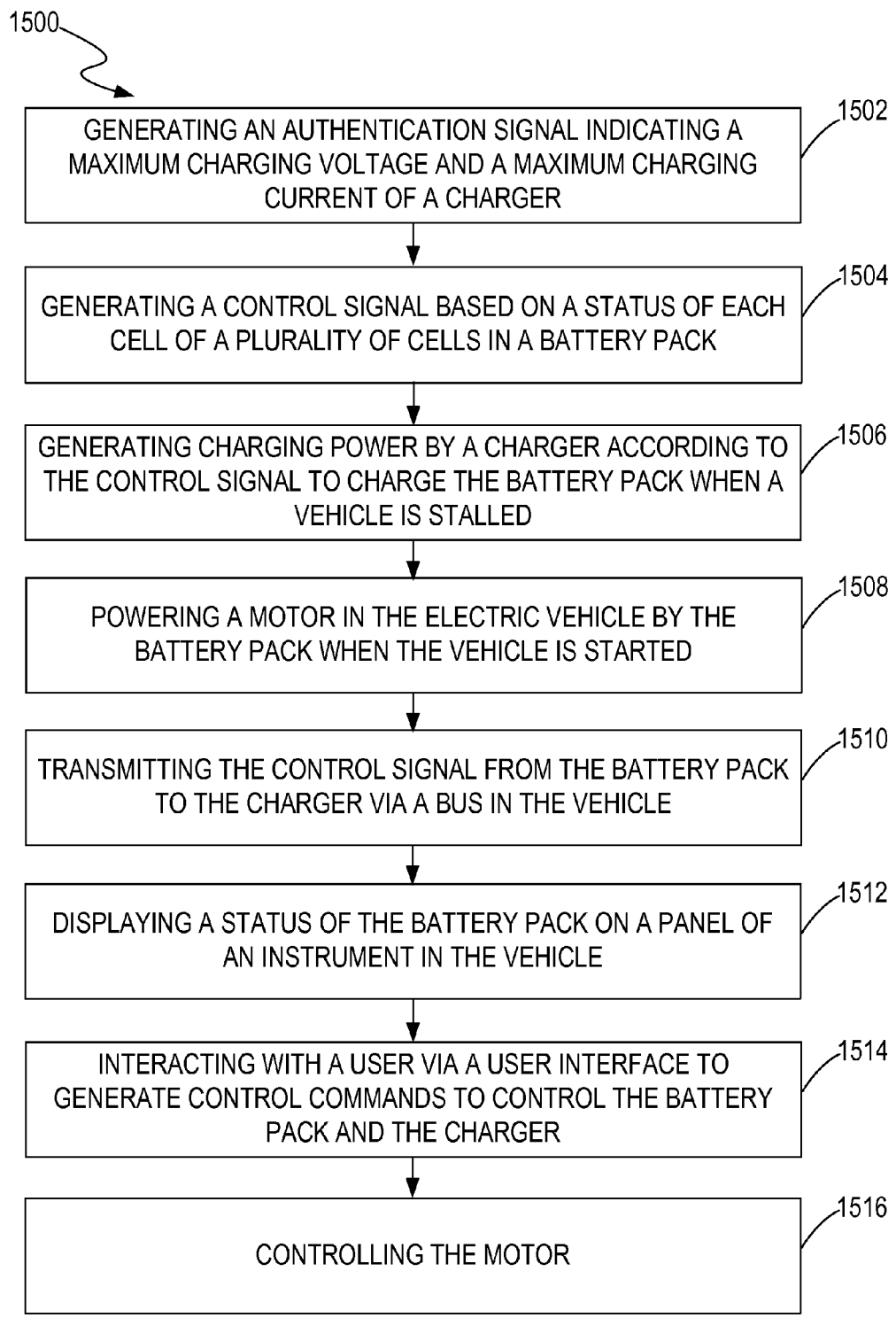
FIG. 15 illustrates a flowchart of operations of a vehicle electronic system, in accordance with one embodiment of the present invention.

FIG. 15 illustrates a flowchart of operations of the vehicle electronic system 1100, in accordance with one embodiment of the present invention. FIG. 15 is described in combination with FIG. 3-FIG. 14. Although specific steps are disclosed in FIG. 15, such steps are examples. That is, the present invention is well suited to performing various other steps or variations of the steps recited in FIG. 15.

In block 1502, an authentication signal, e.g., the authentication signal 1152, indicating a maximum charging voltage and a maximum charging current of a charger, e.g., the charger 1102, is generated.

In block 1504, a control signal, e.g., the control signal 1150, is generated based on a status of each cell of multiple cells in a battery pack, e.g., the cells C1-C9 in the battery pack 1104. In one embodiment, the control signal is generated if the authentication signal indicates the charger is suitable for charging the battery pack. In one embodiment, a termination signal is generated to terminate an operation of the charger if the authentication signal indicates the charger is unsuitable for charging the battery pack. In one embodiment, an electric control unit, e.g., the central ECU 1122, receives multiple status signals from multiple cell modules, e.g., the cell modules 1120_1-1120_3, respectively, and generates the control signal according to the status signals. Each of the cell modules includes a respective number of cells. Each of the status signals indicates a status of each cell of the number of cells. In one embodiment, a supply voltage, e.g., the supply voltage 1156, is provided by the charger to power the electric control unit when the vehicle is stalled. In one embodiment, the battery voltage is converted to a first driving voltage to power the electric control unit and to charge an accumulator, e.g., the accumulator 1136, when the vehicle is started. A second driving voltage is provided by the accumulator to power a component of the vehicle when the vehicle is stalled.

In block 1506, charging power is generated by a charger, according to the control signal to charge the battery pack when an vehicle is stalled. In one embodiment, a reference voltage associated with a charging voltage of the charging power and a reference current associated with a charging current of the charging power is received from the control signal. A pulse signal, e.g., the pulse signal 1326, is generated according to the reference voltage and the reference current. More specifically, a node voltage at a node, e.g., the node 1430, is adjusted based on a comparison of the charging voltage to the reference voltage. The node voltage is also adjusted based on a comparison of the charging current to the reference current. The pulse signal is generated according to the node voltage.

In block 1508, an electric motor, e.g., the motor 1110, is powered by a battery voltage from the battery pack when the vehicle is started. In block 1510, the control signal is transmitted from the battery pack to the charger via a bus, e.g., the bus 1106, in the vehicle.

In block 1512, a status of the battery pack is displayed on a panel of an instrument in the vehicle. In block 1514, a user is interacted with via a user interface to control the battery pack and the charger. In block 1516, the electric motor is controlled by performing multiple steps including starting and stopping the electric motor, selecting a rotation direction of the electric motor, regulating a rotation speed of the electric motor, regulating a torque, and protecting the electric motor against overloads and faults.

While the foregoing description and drawings represent embodiments of the present invention, it will be understood that various additions, modifications and substitutions may be made therein without departing from the spirit and scope of the principles of the present invention. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, and not limited to the foregoing description.

What is claimed is:

1. An electronic system in a vehicle, said electronic system comprising:
    a motor for driving wheels and propellers of said vehicle;
    a charger operable for generating charging power according to a control signal, wherein said charger comprises a charge control module operable for generating an authentication signal indicating a maximum charging voltage and a maximum charging current of said charger;
    a battery pack coupled to said charger and said motor, and operable for receiving said authentication signal, for generating said control signal based upon a status of each cell of a plurality of cells in said battery pack, for receiving said charging power via a charging path when said vehicle is stalled, and for powering said motor via a discharging path when said vehicle is started; and
    a bus coupled to said charger and said battery pack, and operable for transmitting said control signal from said battery pack to said charger.

2. The electronic system as claimed in claim 1, wherein said battery pack further comprises:
    an electric control unit operable for generating said control signal if said authentication signal indicates said charger is suitable for charging said battery pack, and for generating a termination signal to terminate an operation of said charger if said authentication signal indicates said charger is unsuitable for charging said battery pack.

3. The electronic system as claimed in claim 2, wherein said bus transmits said authentication signal from said charger to said battery pack and transmits said termination signal from said battery pack to said charger.

4. The electronic system as claimed in claim 1, wherein said charger further comprises:
    a converter operable for converting input power to said charging power according to a pulse signal;
    a processor coupled to said converter and operable for receiving a reference voltage associated with a charging voltage of said charging power and a reference current associated with a charging current of said charging power from said control signal; and
    a pulse signal generator coupled to said converter and said processor, and operable for generating said pulse signal to adjust said charging power according to said reference voltage and said reference current.

5. The electronic system as claimed in claim 4, wherein said pulse signal generator further comprises:
    a first error amplifier coupled to a node and operable for receiving a first sense signal indicating said charging voltage and for adjusting a node voltage at said node based on a comparison of said charging voltage to said reference voltage; and
    a second error amplifier coupled to said node and operable for receiving a second sense signal indicating said charging current and for adjusting said node voltage based on a comparison of said charging current to said reference current,
    wherein said pulse signal is generated according to said node voltage.

6. The electronic system as claimed in claim 1, further comprising:
    an instrument control unit coupled to said bus and operable for receiving status data indicating a status of said battery pack and for displaying said status on a panel of an instrument in said vehicle.

7. The electronic system as claimed in claim 1, further comprising:
    a vehicle control unit coupled to said bus and a user interface, and operable for interacting with a user via said user interface to generate control commands to control said battery pack and said charger.

8. The electronic system as claimed in claim 1, further comprising:
    a motor driver processing unit coupled to said bus and said motor, and operable for performing an operation selected from a group consisting of starting and stopping said motor, selecting a rotation direction of said motor, regulating a rotation speed of said motor, regulating a torque, and protecting said motor against overloads and faults.

9. A method for controlling a vehicle, said method comprising:
    generating a control signal based upon a status of each cell of a plurality of cells in a battery pack;
    generating charging power by a charger according to said control signal to charge said battery pack when said vehicle is stalled;
    powering a motor in said vehicle by said battery pack when said vehicle is started;
    transmitting said control signal from said battery pack to said charger via a bus in said vehicle;
    receiving an authentication signal indicating a maximum charging voltage and a maximum charging current of said charger;
    generating said control signal if said authentication signal indicates said charger is suitable for charging said battery pack; and
    generating a termination signal to terminate an operation of said charger if said authentication signal indicates said charger is unsuitable for charging said battery pack.

10. The method as claimed in claim 9, further comprising:
    receiving a reference voltage associated with a charging voltage of said charging power and a reference current associated with a charging current of said charging power from said control signal;
    generating a pulse signal according to said reference voltage and said reference current; and
    converting input power to said charging power according to said pulse signal.

11. The method as claimed in claim 10, further comprising:
adjusting a node voltage at a node based on a comparison of said charging voltage to said reference voltage;
adjusting said node voltage based on a comparison of said charging current to said reference current; and
generating said pulse signal according to said node voltage.

12. The electronic system as claimed in claim 1, wherein said battery pack further comprises:
a plurality of cell modules for providing a plurality of status signals, wherein each of said cell modules comprises a number of cells and provides a status signal which indicates a status of each cell of said number of cells; and
an electric control unit coupled to said cell modules and operable for generating said control signal according to said status signals.

13. The electronic system as claimed in claim 12, wherein said charger comprises:
a supply module operable for providing a supply voltage to power said electric control unit when said vehicle is stalled.

14. The electronic system as claimed in claim 12, further comprising:
a direct current (DC) to DC converter coupled to said battery pack and operable for converting a battery voltage of said battery pack to a first driving voltage to power said electric control unit when said vehicle is started.

15. The electronic system as claimed in claim 14, further comprising:
an accumulator charged by said first driving voltage when said vehicle is started and operable for providing a second driving voltage to power a component of said vehicle when said vehicle is stalled.

16. The electronic system as claimed in claim 1, wherein said bus works in accordance with a protocol selected from a group consisting of: a controller area network (CAN) protocol, a vehicle area network (VAN) protocol, a local interconnect network (LIN) protocol, and a FlexRay protocol.

17. The method as claimed in claim 9, further comprising:
receiving a plurality of status signals from a plurality of cell modules respectively by an electric control unit, wherein each of said cell modules comprises a respective number of cells, and wherein each of said status signals indicates a status of each cell of said number of cells; and
generating said control signal by said electric control unit according to said status signals.

18. The method as claimed in claim 9, further comprising:
providing a supply voltage by said charger to power said electric control unit when said vehicle is stalled; and
converting a battery voltage from said battery pack to a driving voltage to power said electric control unit when said vehicle is started.

\* \* \* \* \*